(12) United States Patent
Laracey

(10) Patent No.: US 10,984,406 B2
(45) Date of Patent: Apr. 20, 2021

(54) NFC MOBILE WALLET PROCESSING SYSTEMS AND METHODS

(71) Applicant: PAYPAL, INC., San Jose, CA (US)

(72) Inventor: Kevin Laracey, Natick, MA (US)

(73) Assignee: PAYPAL, INC., San Jose, CA (US)

( * ) Notice: Subject to any disclaimer, the term of this patent is extended or adjusted under 35 U.S.C. 154(b) by 59 days.

(21) Appl. No.: 16/424,123

(22) Filed: May 28, 2019

(65) Prior Publication Data

US 2019/0347646 A1    Nov. 14, 2019

Related U.S. Application Data

(63) Continuation of application No. 14/632,949, filed on Feb. 26, 2015, now Pat. No. 10,304,051, and a continuation-in-part of application No. 14/169,067, filed on Jan. 30, 2014, now Pat. No. 9,208,482, and a continuation-in-part of application No. 14/140,165, filed on Dec. 24, 2013, now Pat. No. 9,412,106, and a continuation-in-part of application No. 13/893,978, filed on May 14, 2013, and a continuation-in-part of application No. 13/768,156, filed on Feb. 15, 2013, now Pat. No. 9,305,295, and a continuation-in-part of application No. 13/731,348, filed on Dec. 31, 2012, now Pat. No. 9,400,978, said application No. 14/140,165 is a continuation of application No. 13/336,574, filed on Dec. 23, 2011, now Pat. No. 8,632,000, which is a continuation-in-part of application No. 12/846,911, filed on Jul. 30, 2010, now Pat. No. 8,380,177, said application No. 13/768,156 is a continuation of application No. 12/846,911, filed on Jul. 30, 2010, now Pat. No.

(Continued)

(51) Int. Cl.
| | |
|---|---|
| *G06Q 20/32* | (2012.01) |
| *G06Q 20/20* | (2012.01) |
| *G06Q 20/36* | (2012.01) |
| *G06Q 20/10* | (2012.01) |
| *G06Q 30/06* | (2012.01) |
| *G06Q 30/02* | (2012.01) |

(52) U.S. Cl.
CPC ....... *G06Q 20/3278* (2013.01); *G06Q 20/108* (2013.01); *G06Q 20/20* (2013.01); *G06Q 20/322* (2013.01); *G06Q 20/3276* (2013.01); *G06Q 20/36* (2013.01); *G06Q 30/0226* (2013.01); *G06Q 30/0241* (2013.01); *G06Q 30/0253* (2013.01); *G06Q 30/06* (2013.01)

(58) Field of Classification Search
CPC .... G06Q 20/385; G06Q 20/40; G06Q 20/401; G06Q 20/20; G06Q 20/3278
See application file for complete search history.

(56) References Cited

U.S. PATENT DOCUMENTS

| | | | | |
|---|---|---|---|---|
| 2006/0085270 A1* | 4/2006 | Ruckart | ............... | G06Q 20/202 705/21 |
| 2007/0052517 A1* | 3/2007 | Bishop | .................. | G06Q 20/32 340/5.2 |

(Continued)

*Primary Examiner* — Hao Fu
(74) *Attorney, Agent, or Firm* — Haynes and Boone, LLP

(57) ABSTRACT

Embodiments of the present invention relate to systems, methods, processes, computer program code, and means for employing the wireless or near field communication ("NFC") functionality of mobile devices and payment terminals for use in payment, loyalty, and offer and coupon transactions.

20 Claims, 11 Drawing Sheets

Related U.S. Application Data

8,380,177, said application No. 13/731,348 is a continuation-in-part of application No. 12/846,911, filed on Jul. 30, 2010, now Pat. No. 8,380,177.

(60) Provisional application No. 61/944,987, filed on Feb. 26, 2014, provisional application No. 61/758,543, filed on Jan. 30, 2013, provisional application No. 61/651,177, filed on May 24, 2012, provisional application No. 61/646,523, filed on May 14, 2012, provisional application No. 61/582,010, filed on Dec. 30, 2011, provisional application No. 61/426,731, filed on Dec. 23, 2010, provisional application No. 61/362,567, filed on Jul. 8, 2010, provisional application No. 61/322,477, filed on Apr. 9, 2010.

(56) References Cited

U.S. PATENT DOCUMENTS

| | | | | |
|---|---|---|---|---|
| 2010/0276484 | A1* | 11/2010 | Banerjee | G06Q 30/06 235/379 |
| 2012/0193434 | A1* | 8/2012 | Grigg | G06Q 20/3278 235/492 |
| 2013/0054336 | A1* | 2/2013 | Graylin | H04L 67/02 705/14.26 |
| 2013/0179285 | A1* | 7/2013 | Lyle | G06Q 30/06 705/26.1 |
| 2013/0290087 | A1* | 10/2013 | Merwarth | G06Q 30/02 705/14.27 |
| 2014/0188586 | A1* | 7/2014 | Carpenter | G06Q 20/02 705/14.23 |

* cited by examiner

NFC MOBILE WALLET PROCESSING SYSTEMS AND METHODS

CROSS REFERENCE TO RELATED APPLICATIONS

The present application is a continuation application of U.S. Utility patent application Ser. No. 14/632,949, filed on Feb. 26, 2015, which in turn claims the benefit of U.S. Provisional Application No. 61/944,987, filed Feb. 26, 2014. The present application is a continuation-in-part of U.S. patent application Ser. No. 13/768,156, filed Feb. 15, 2013, which is a continuation of U.S. patent application Ser. No. 12/846,911, filed Jul. 30, 2010, now U.S. Pat. No. 8,380,177, issued Feb. 19, 2013, which claims the benefit of U.S. Provisional Application No. 61/362,567, filed Jul. 8, 2010, and U.S. Provisional Application No. 61/322,477, filed Apr. 9, 2010. The present application is a continuation-in-part of U.S. patent application Ser. No. 13/731,348, filed Dec. 31, 2012, which claims the benefit of U.S. Provisional Application No. 61/651,177, filed May 24, 2012, and U.S. Provisional Application No. 61/582,010, filed Dec. 30, 2011. U.S. patent application Ser. No. 13/731,348, filed Dec. 31, 2012, is a continuation-in-part of U.S. patent application Ser. No. 12/846,911, filed Jul. 30, 2010, now U.S. Pat. No. 8,380,177, issued Feb. 19, 2013, which claims the benefit of U.S. Provisional Application No. 61/362,567, filed Jul. 8, 2010, and U.S. Provisional Application No. 61/322,477, filed Apr. 9, 2010. The present application is a continuation-in-part of U.S. patent application Ser. No. 14/140,165, filed Dec. 24, 2013, which is a continuation of U.S. patent application Ser. No. 13/336,574, filed Dec. 23, 2011, now U.S. Pat. No. 8,632,000, issued Jan. 21, 2014, which claims the benefit of U.S. Provisional Application No. 61/426,731, filed Dec. 23, 2010. U.S. patent application Ser. No. 13/336,574, filed Dec. 23, 2011, now U.S. Pat. No. 8,632,000, issued Jan. 21, 2014, is a continuation-in-part of U.S. patent application Ser. No. 12/846,911, filed Jul. 30, 2010, now U.S. Pat. No. 8,380,177, issued Feb. 19, 2013, which claims the benefit of U.S. Provisional Application No. 61/362,567, filed Jul. 8, 2010, and U.S. Provisional Application No. 61/322,477, filed Apr. 9, 2010. The present application is a continuation-in-part of U.S. patent application Ser. No. 14/169,067, filed Jan. 30, 2014, which claims the benefit of U.S. Provisional Application No. 61/758,543, filed Jan. 30, 2013. The present application is a continuation-in-part of U.S. patent application Ser. No. 13/893,978, filed May 14, 2013, which claims the benefit of U.S. Provisional No. 61/646,523, filed May 14, 2012. U.S. Provisional Application No. 61/944,987, filed Feb. 26, 2014, U.S. patent application Ser. No. 13/731,348, filed Dec. 31, 2012, and U.S. patent application Ser. No. 12/846,911, filed Jul. 30, 2010, now U.S. Pat. No. 8,380,177, issued Feb. 19, 2013, are all hereby incorporated by reference in their entirety for all purposes.

BACKGROUND

Increasingly, mobile devices such as smart phones now include near field communication ("NFC") technologies allowing the mobile device to use NFC to communicate with readers, tags and other NFC devices. A number of payment schemes have been proposed which allow NFC-enabled mobile devices to act as payment devices. Unfortunately, these payment schemes generally suffer from a number of problems.

It would be desirable to provide methods and systems for employing NFC features of mobile devices for use in payment transactions that solve these and other problems. Other advantages and features will become apparent upon reading the following disclosure.

DESCRIPTION

Figure 1:
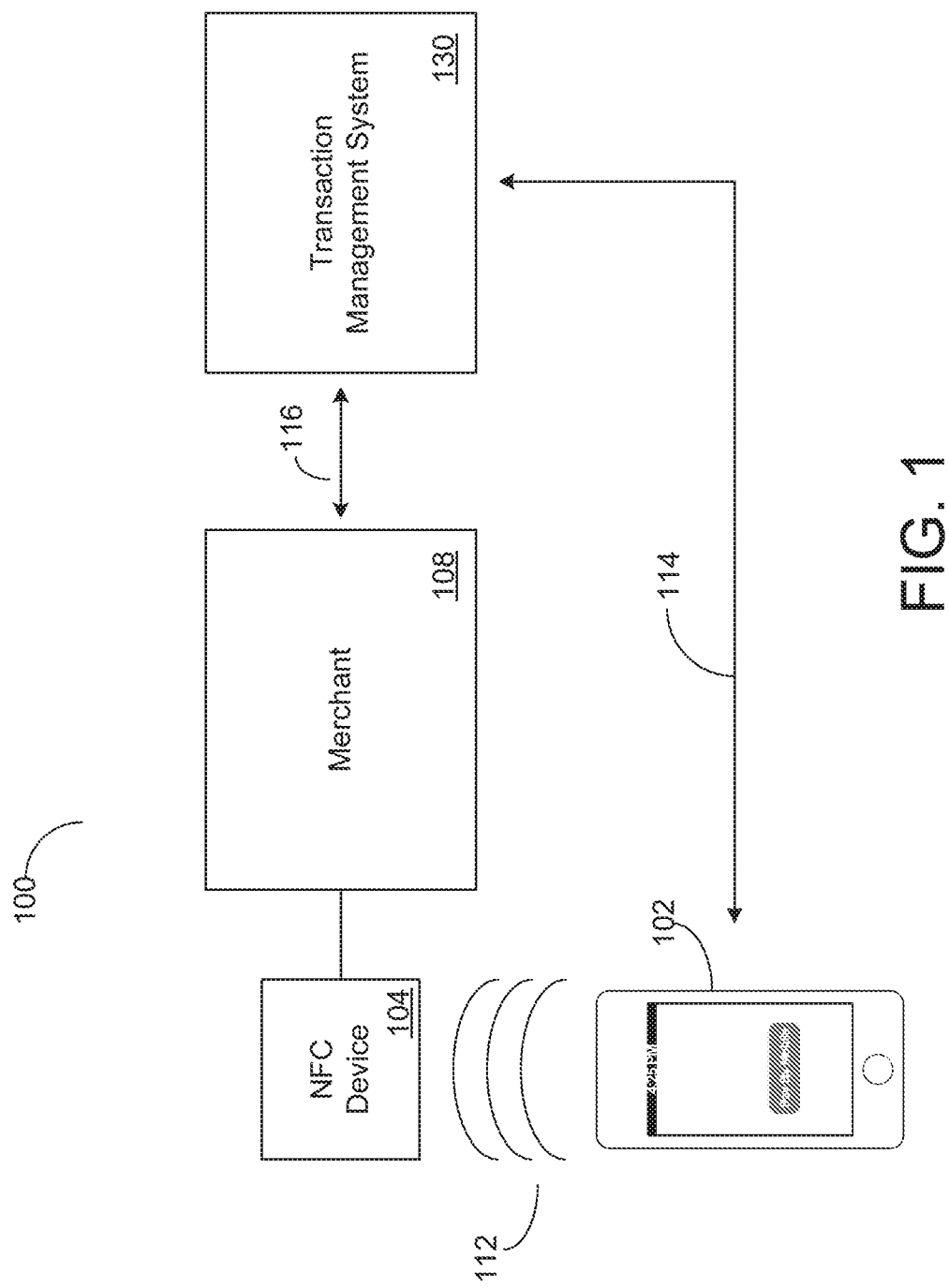
FIG. 1 is a block diagram depicting a payment system configured pursuant to some embodiments.

Embodiments of the present invention relate to systems, methods, processes, computer program code, and means for employing the wireless or near field communication ("NFC") functionality of mobile devices and payment terminals for use in payment, loyalty, and offer and coupon transactions. In general, embodiments may be deployed in conjunction with a system such as that described by the inventors in their co-pending and commonly assigned applications referenced above in which mobile devices may be used to conduct transactions by scanning, capturing, retrieving or otherwise entering a code associated with a transaction. Features of some embodiments will be described in conjunction with a payment system in which a mobile device is used to initiate a transaction at a merchant location (or, in some embodiments, at an automated teller machine, a kiosk, or the like). More particularly, embodiments will be described in which a mobile device may be used to obtain a checkout token for use in a transaction where the checkout token is wirelessly communicated to a merchant for use in a transaction. While some embodiments are described herein with reference to NFC communication between the mobile device and the merchant, in some embodiments, other wireless communication techniques may be used such as, for example, Bluetooth, Bluetooth Low Energy, Wifi, or the like. As a result, in some embodiments, the term "NFC" is used herein as an illustrative, but not limiting, communication mode.

Features of the present invention will be described assuming the use of the payment systems described in our co-pending applications referenced above, and the details of those systems will not be fully reiterated herein. However, embodiments of the present invention are not limited to use in conjunction with the payment systems described in our co-pending applications. Instead, the use of NFC functionality as described herein may be used with desirable results and benefits in a wide variety of payment systems, digital wallets, or the like.

Embodiments of the present invention allow NFC enabled mobile devices to conduct transactions at NFC terminals (such as, for example, NFC payment terminals operating pursuant to standards such as Visa International's "PayWave", MasterCard International's "PayPass", Discover's "Zip", and American Express' "ExpressPay" standards). Pursuant to some embodiments, such transactions may be made using mobile devices which do not have a secure element. As will become apparent based on the following disclosure to those skilled in the art, embodiments of the present invention provide a number of desirable benefits, including, for example: (1) allowing secure NFC transactions using mobile devices without secure elements, (2) allowing the presentation of card linked offers to users before they tap their mobile device at the NFC terminal 3) enabling a single tap of the mobile device on an NFC terminal to initiate multiple transactions related to an in-store transaction including payment credential selection and delivery, loyalty credential selection and delivery, and coupon and offer selection and delivery, (4) ensuring that a so-called "high value token" is not stored on the mobile device (where a "high value token" is described by the Payment Card Industry ("PCI") as any piece of information that can move money from a consumer's account), (5) compliance with governmental financial guidelines and regulations such as those promulgated by the U.S. Federal Financial Institutions Examination Council ("FFIEC") that dictate that funds are moved from a consumer's account only in the context of a secure, multi-factor authenticated session, and (6) reducing the amount of integration work that is required to make the present invention work with an in-store point of sale terminal.

Pursuant to some embodiments, NFC transactions are made possible which enjoy the above-mentioned desirable benefits using standard NFC mobile devices, standard NFC terminals, and a standard payment authorization system in conjunction with one or more transaction management systems (such as those described in our co-pending and commonly assigned applications referenced above).

Pursuant to some embodiments, an NFC enabled mobile device (such as a mobile telephone) is operated to transmit a standard NFC message to an NFC terminal. In some embodiments, the NFC message appears to contain a valid payment account number (such as a primary account number or "PAN") so that the NFC terminal can obtain the number and transmit it through the standard payment networks for authorization processing. Pursuant to some embodiments, the NFC message does not utilize an actual payment account number—instead, a substitute account number is used (referred to herein as a "checkout token" or a "token"). Pursuant to some embodiments, all or a portion of the checkout token transmitted from the NFC enabled mobile device may be information used to route the checkout token and other transaction details to an entity such as a transaction management system for further processing. In some cases, information passed from the NFC terminal including the checkout token is combined with information from the point of sale system, including the amount to be paid and other details about a particular transaction, as well as information identifying the merchant, and other information. This information is then routed to an authorization entity and is used to authorize a payment.

For example, the first six digits of the checkout token may be used to identify the particular entity (such as the operator of a particular instance of the transaction management system pursuant to the present invention) to which the checkout token (and, in some embodiments, other transaction details) should be routed. For example, the checkout token may be formatted such that it appears to be a standard payment account number (or "PAN") with the first six digits acting as the bank identification number ("BIN") or issuer identification number ("IIN") or other routing number (e.g., as specified in ISO/IEC 7812, parts 1 and 2 or the like). In this manner, the checkout token may be routed to the appropriate entity for further transaction processing using the standard payment authorization network in communication with a standard NFC terminal and standard retailer systems. In some embodiments, the checkout token may be formatted as an alphanumeric or other code such that it is usable by a merchant or other processing entity to identify the appropriate entity to route the token.

Features of some embodiments of the present invention will now be described by reference to FIG. 1, which is a block diagram of a system 100 pursuant to some embodiments. Further details of the system 100 may be obtained by reference to our co-pending applications incorporated by reference herein. As shown, a payment account holder, buyer, or other user or operator (hereafter, the "customer" or the "user") may have or use a mobile device 102 (such as a mobile telephone or the like). The mobile device 102 has a display screen and a data entry device (such as a keypad or touch screen). Pursuant to embodiments of the present invention, the customer may use the mobile device 102 to conduct a transaction with a merchant 108 or other entity (such as a bank) via a near field communication ("NFC") device 104.

The NFC device 104 may be, for example, part of (or a component associated with) a point of sale terminal or point of interaction, an automated teller machine, a kiosk, a mobile point of sale including another mobile device, or the like. The merchant may be a physical storefront, electronic commerce merchant, or mail order and telephone ("MOTO") merchant (or another person or entity). Further, the merchant need not be a "merchant", but may also be another individual (in the case of person to person transactions), or a kiosk or other unattended device (such as an automated teller machine ("ATM") or the like.

Pursuant to some embodiments, the mobile device 102 is an NFC-enabled mobile device such as a mobile telephone having a radio frequency identification ("RFID") chip installed therein (either as a part of the mobile telephone's chip set, or installed as an after-market SIM card). As a specific example, the mobile telephone may be an iPhone 6, a Google® Nexus S, or a Blackberry® 9600 smartphone each of which have RFID chips installed therein. Pursuant to some embodiments, the mobile device 102 may be operated pursuant to ISO/IEC 18092, NFC IP-I and ISO/IEC 14443 contactless communication standards. Further, the mobile device 102 and the NFC reader 104 may interact pursuant to one or more NFC payment standards (such as the Visa® "PayWave" standard, the Discover® "Zip" standard, or the like) in which a series of messages may be transmitted via NFC communication channel 112 between the mobile device 102 and the NFC reader 104 to provide a payment account number or other information for use by the NFC reader 104 to facilitate a transaction.

As shown in FIG. 1, the merchant 108 may be in communication with one or more payment networks 116. In some embodiments, the communication between a merchant 108 and the one or more payment networks 116 may be a direct or indirect communication (e.g., where the merchant 108 is in communication with the one or more payment networks 116 via one or more intermediaries such as merchant processors or gateway providers). For example, the merchant 108 may transmit payment authorization request messages (such as, for example, messages in accordance with ISO Standard 8583 or the like) to the payment network 116 for routing to entities such as financial instrument issuers and their agents. Pursuant to some embodiments of the present invention, the merchant 108 may also be in communication with one or more transaction management systems 130 via the payment networks 116. Operation of the system pursuant to some embodiments of the present invention will now be described.

A user operating the mobile device 102 approaches a point of transaction to conduct a transaction. The user interacts with a payment application on the mobile device 102 to initiate a transaction (or to otherwise prepare to conduct a transaction). For example, the user (or a point of sale clerk on behalf of the user) may select an option to "pay with NFC," "pay with mobile" or the like, or the user may simply tap their phone on the terminal to initiate a transaction after seeing a prompt on the terminal to do so or receiving a prompt from the point of sale clerk. The payment application may optionally then prompt the user to authenticate themselves (e.g., using a password, fingerprint recognition module on the mobile device, iris scan, voiceprint or other techniques some of which are described in our co-pending and commonly assigned applications). The authentication process may occur between the mobile device 102 and the transaction management system 130 over a communication link 114. Once the user (and the mobile device 102 in some embodiments) have successfully been authenticated to the transaction management system 130, an identifier (referred to herein as the "checkout token") is provided to the mobile device 102 from the transaction management system 130. The checkout token may be, for example, a transaction identifier, a checkout token, a session identifier, a wallet identifier, a user identifier, or the like. In some embodiments, the "checkout token" (whether it be a transaction, session, wallet, or user identifier) is formatted such that it may be processed or routed using the payment network 116 (as will be described further below).

In some embodiments, the transaction management system 130 may provide one or more checkout tokens to the mobile device 102 so that additional checkout tokens may be cached or otherwise stored for use on the mobile device 102 such as in the case where, at the time of transaction, the user is unable to connect from their mobile device 102 to the transaction management system 130. In some embodiments, it is possible to retrieve checkout tokens at any time and in any quantity. In some embodiments, the mobile device 102 may retrieve one or more checkout tokens immediately after completion of a separate transaction for use with the next transaction, or just before a transaction is initiated.

The mobile device 102 (under control of the payment application) may prompt the user to tap or present the mobile device 102 at an NFC reader 104 to continue the transaction. The NFC chip on the mobile device 102 causes information to be passed to the NFC reader 104 over NFC communication path 112. Such information includes, for example, the checkout token. In some embodiments, the checkout token is passed to the NFC reader 104 using a standard messaging protocol supported by the NFC reader 104. For example, the checkout token may be transmitted to the NFC reader 104 in a message data field used for the PAN, in a message data field used for track data, or in other data fields supported by the standard messaging protocol.

In some embodiments, the message data captured by the NFC reader 104 is combined with transaction data collected by the merchant 108 and the merchant 108 creates a standard payment authorization (or other standard payment message) request message for transmission to a payment network 116. In some embodiments, the transaction data and the NFC message data are combined together in a single device, such as a desktop payment terminal like a Verifone VX570 or the like, a mobile point of sale device including devices that enable magnetic stripe and EMV transactions to be performed using a mobile device such as the devices from companies like PayPal®, Square®, and others, or a mobile device for person to person transactions, or the like.

The payment network 116 (or an acquirer processor or other entity associated with the payment network 116), analyzes the request message and determines that the message should be routed to the transaction management system 130 (the system that issued the checkout token). This routing determination may be made at or by any of a number of different devices or entities, including, for example, at a payment terminal, at a retailer system (such as at the point of transaction, point of sale, or at a retailer payment switch), at a payment gateway, at a merchant processor system, at a payment network, or at a payment card issuer system (or any other system capable of reading information that would normally be passed on by the payment terminal to enable authorization of a payment transaction). In some embodiments, the routing determination may be made by the merchant system 109, e.g., by consulting a BIN table or other routing table and comparing values in a BIN table or other routing table to values in the checkout token or other data that is communicated from the mobile device 102 along with the checkout token to the merchant system 109.

In some embodiments, the merchant, processor or other entity may add additional information to the request message including, for example, a merchant identifier, a terminal identifier, a time stamp, a date stamp, or the like.

To determine where to route the request message, the processor or entity may look for information such as the PAN in the message (e.g., to identify whether the PAN falls within a range of PANs that would signify that the message should be routed to the transaction management system 130 to complete the authorization), or the BIN or IIN portion of the PAN, information in the track data that is passed as part of the message, or other data that is passed as part of the message. In some embodiments, the checkout token may not contain a conventional numeric PAN, but may instead contain an alphanumeric identifier, or an identifier containing any set of characters. In some embodiments, use of a conventional numeric PAN is desirable since many payment transaction routing methods and systems make routing decisions based on information contained in a PAN.

If the processor or entity detects that the request message should be routed to a transaction management system 130 by, for example, seeing that the message includes a PAN that falls within a range of PANs allocated to the operator of the transaction management system 130 (which can also be thought of as the authorizing entity for the request message), then the message is routed to that transaction management system 130. In some embodiments, different values contained in a checkout token may be used to represent different routing paths. As an illustrative example, routing rules and processing may be configured such that a value of "1111" found in a checkout token could indicate routing to a first transaction management system and the value of "1211" in a checkout token would indicate routing to a second transaction management system different from the first transaction management system (where the first and second transaction management systems could be operated by or on behalf of different entities or be different devices or systems operated by or on behalf of the same entity).

The checkout token included in the message is extracted and used by the transaction management system 130 to find a match with an existing identifier associated with an active mobile wallet session (established when the user operated the mobile device to perform the initial authentication). When a match occurs, the transaction management system 130 then performs processing as described in our co-pending applications referenced above and the user is presented with information such as, for example: an amount due, a merchant name, a list of available payment instruments, a list of available offers, and perhaps a button to select to confirm the transaction.

When the user interacts with the mobile device 102 to select a payment instrument, the transaction management system 130 creates an authorization message and routes it to the appropriate authorizing entity for that payment instrument (such as the issuer of that specific payment instrument). When the transaction management system 130 receives a successful authorization, the transaction management system 130 then sends an authorization success message to the processor (the merchant acquirer, payment network, issuer, or the like) that originally passed the request message to the transaction management system 130. Upon receipt of the message from the transaction management system 130, the processor then passes a successful authorization message back up the chain of processors such that the merchant ultimately receives an authorization message and the transaction concludes.

One other benefit of some embodiments of the present invention is that the operator of the mobile device 102 could still complete a payment transaction even if the operator of the mobile device 102 does not have an active session in place with the transaction management system 130. This might be the case if the user was unable to get Wifi or 3G/4G/cellular connectivity from their mobile device 102, for example.

In some embodiments, such as when the transaction management system 130 receives a message (with a checkout token) from a merchant system 109 and the transaction management system 130 is unable to match the checkout token with an active session (or pending transaction record), the transaction management system 130 may first determine if the checkout token received was a valid checkout token. In some embodiments, a checkout token's validity may be determined by looking at a number of data values that may include (but are not be limited to) the presence of the token in a list of issued and outstanding checkout tokens, determining if the checkout token had expired based on time to live values assigned to the token, the presence of a valid digital signature or other value created when the NFC radio on the mobile device 102 interacted with the NFC reader 104, the identity of the merchant 108, information identifying the mobile device 102 used in the transaction, the amount of the transaction, the time of day, a security profile associated with the merchant 108, a security profile associated with the device, and other factors.

Assuming that the checkout token was determined to be valid, the transaction management system 130 could create an authorization message using a default payment credential, since the absence of an active session with the user means that the user would not be able to provide the transaction management system 130 with a selection in real time. One or more default payment instruments may be specified by the user as part of the signup process for a service based on the present invention (as described in conjunction with FIG. 3). Multiple default instruments might be specified, since some merchants might not accept the users "preferred" default instrument such as an American Express card. In addition, the user might specify rules describing which payment instrument or instruments should be selected based on the amount of the purchase, the merchant, the instrument that maximizes loyalty points earned, the instrument that results in the lowest price for the user, or a number of other factors. These and other factors may be evaluated separately or in combination to come up with the best selection of payment instrument for the user. With this method, a user might specify that if a gift card balance exists for a gift card that can be used for a particular transaction at a particular merchant, then the gift card balance should be exhausted with any remaining outstanding amount to be applied against the customer's preferred credit card. In this way, even without an active session and without interactively specifying which instruments to use to pay for a transaction, a split tender/multi-tender transaction can be completed.

Processing would then proceed as described above. The transaction management system 130 would then create an authorization message for one or more of the default payment instruments to be sent to an authorizing entity, and would route the authorization or decline message(s) to the processor, which would then pass the authorization or decline message(s) back up the chain of processors such that the merchant 108 ultimately receives one or more authorization and/or decline messages and the transaction concludes.

Another benefit of the current invention is that a user could see which payment instrument(s) had associated card linked offers that would be applicable to a pending transaction. This would be helpful to the user since with current payment solutions that utilize magnetic stripe cards, or NFC or other mechanisms to associate a mobile user, mobile device, and or a payment instrument identifier stored on a mobile device with a pending transaction at a point of sale, there is not an ability to show the user which payment instruments have card linked offers that are valid at the merchant where the user has a pending transaction before the user selects the payment instruments to use to pay for the transaction.

Card linked offers are typically selected by a user to be affiliated with a particular payment instrument using a user interface provided by the issuer of a payment card in an online account management system. This is done in advance of any payment transaction, and it is frequently the case that the user does not remember when deciding which payment instrument(s) to use to pay for a particular transaction whether there are any offers associated with the instrument, and the terms associated with each offer, such as which merchant(s) an offer would apply to, and what other terms and conditions of the offer need to be satisfied such as the amount of the transaction, time of day, SKU's associated with goods that need to be purchased, locations where the offer is valid, etc.

This is possible in embodiments of the present invention because the transaction management system 130 can have real time access to the list of any offers that are tied to a particular payment instrument, and by comparing meta data associated with the offer—including but not limited to the name of the merchant(s) where the offer is valid, the location(s) of the merchant(s) where the offer is valid, the offer terms—such as the dates when the offer is valid, the minimum transaction size, the item descriptions (which could include SKU numbers or other identifiers) that the user must purchase for the offer to be valid and applicable to a particular transaction, the type of user of the present invention (based on a user segmentation scheme or persona that may include the user's age, location, purchase history and any other demographic, psychographic or behavioral data) for which the offer is valid)—to meta data about the transaction such as the merchant name, location, etc., the transaction management system 130 can provide the user of a mobile device 102 with a visual indicator associated with each payment instrument to show the user that a payment instrument has affiliated card linked offers. In addition, the transaction management system 130 could provide information to the mobile device 102 to display to the user a list of the offers including the reward the user receives when the offer is redeemed such as the amount off the purchase, loyalty points earned, or other reward, as well as provide access to a full list of the terms and conditions associated with the offer. In the case where there are multiple card linked offers that could be redeemed as part of a transaction, the present invention can also present the user with an interface allowing them to select which of the available offers should be redeemed as part of the transaction. In this way, embodiments of the present invention can help users make more informed purchase decisions by helping users know before they select one or more payment instruments which payment instrument(s) have associated card linked offers that are valid for a particular pending transaction.

It should be noted as described in our other co-pending applications that offers may also be tied to the mobile wallet application and are not necessarily be affiliated in all cases to a payment instrument. Card linked offers pre-date the arrival of mobile device based payment and mobile wallet solutions. In the case of mobile wallet or mobile application based offers, the issuer of the mobile wallet application might provide an interface for users to choose the offers that they wanted to be able to redeem when using a particular mobile wallet application. In this way, the offers would be affiliated or linked with the wallet and not a particular payment instrument or payment instrument issuer. This approach has the advantage of enabling offers to be applied to purchases regardless of which payment instrument or payment instruments the user chooses to use to pay for a particular transaction. Just as card linked offers and the number and variety of offers made available are a key means for credit card issuers to differentiate their offerings, so too will wallet linked offers become a key means for different wallet issuers to differentiate their offerings. In any case—card linked or wallet linked offers—the transaction management system 130 would have access to metadata about offers as described above. This could be a centralized store of information about both wallet linked and card linked offers, or it could be a decentralized data store. In the case of a decentralized data store of offer meta data, information stored about payment instruments might contain a link to a separate data store perhaps controlled by a payment instrument issuer that would provide on demand access the details about the number of offers associated with a payment instrument, and the key terms and conditions associated with each offer. In this way, payment instrument issuers could retain control over data stores containing offer meta data, and operators of transaction management systems 130 would not have to ensure that data was always synchronized between the payment instrument issuer's repository of offer meta data and the repository maintained by the operator of the transaction management system 130.

Figure 2:
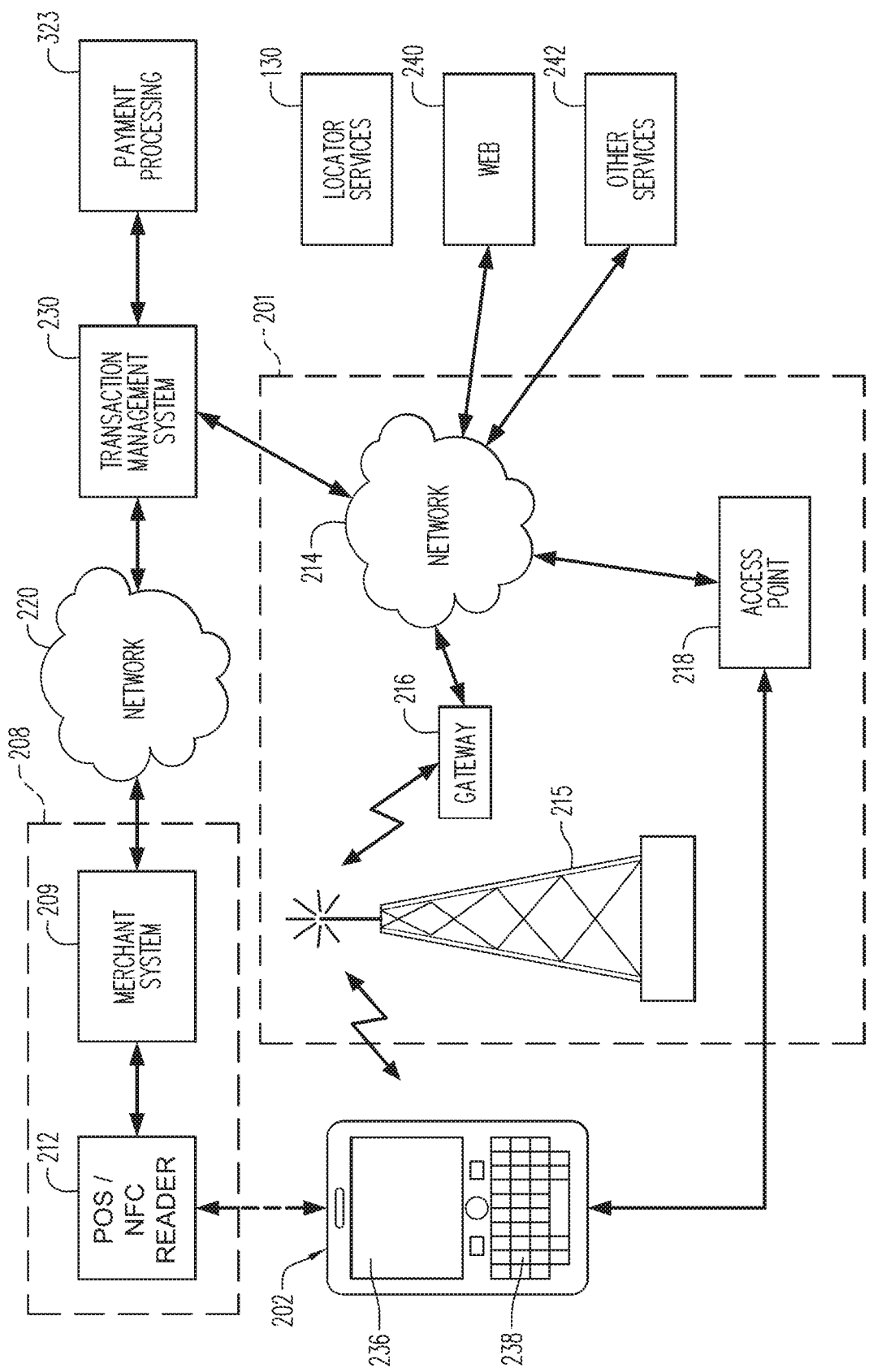
FIG. 2 is a block diagram depicting further details of a payment system configured pursuant to some embodiments.

Further details of some aspects of a system according to some embodiments of the present invention will now be described by reference to FIG. 2. FIG. 2 is a block diagram of an example payment system network environment showing communication paths between a mobile device 202, merchants 208, transaction management system 230 and payment processing systems 232. Mobile device 202 may be, for example, an NFC enabled mobile telephone, PDA, personal computer, or the like. For example, mobile device 202 may be a mobile device having an RFID chip installed therein allowing the device to be operated pursuant to ISO/IEC 18092, NFC IP-I or the ISO/IEC 14443 contactless communication standards, or other applicable contactless communication standards and wireless technologies including but not limited to those emerging for Bluetooth and Bluetooth Low Energy (BLE). Further, the mobile device 202 may be operated to interact with an NFC reader pursuant to one or more NFC payment standards. Pursuant to some embodiments, mobile device 202 may operate a payment application allowing mobile device 202 to operate as a payment device as described herein. In some embodiments, mobile device 202 is capable of accessing and displaying Web content or otherwise accessing the Internet so that a customer operating mobile device 202 may interact with transaction management system 230 to initiate a transaction via a Web interface.

Mobile device 202 of FIG. 2 can, for example, communicate over one or more wired and/or wireless networks 201. As an example, a wireless network can be a cellular network (represented by a cell transmitter 215). A mobile device 202 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11g, Bluetooth (or other) communication standards. For example, in embodiments in which a mobile device 202 is operating a payment application which allows mobile device 202 to function as a payment device pursuant to the invention, the payment application may cause or control communication of data through network 201 to transaction management system 230.

In some embodiments, mobile device 202 may engage in both voice and data communications over wireless network 214 via access point 218. For example, mobile device 202 may be able to place or receive phone calls, send and receive emails, send and receive short message service ("SMS") messages, send and receive email messages, access electronic documents, send and receive streaming media, or the like, over the wireless network through access point 218. Similar communications may be made via network 215.

In some embodiments, a mobile device 202 may also establish communication by other means, such as, for example, wired connections with networks, peer-to-peer communication with other devices (e.g., using Bluetooth networking, Bluetooth Low Energy or the like), etc. Mobile device 202 can, for example, communicate with one or more services over networks 201, such as the transaction management system 230 (to conduct payment transactions, to create, edit, view or otherwise modify payment account settings and preferences, etc.), access coupons and offers, the Web 240, and other services 242. Mobile device 202 can also access other data over the one or more wired and/or wireless networks 201. For example, content providers, such as news sites, RSS feeds, web sites, biogs, social networking sites, developer networks, etc., can be accessed by mobile device 202. Such access can be provided by invocation of a web browsing function or application (e.g., a browser) in response to a customer launching a Web browser application installed on mobile device 202. In some embodiments, a user may utilize a Web browser to interact with transaction management system 230 to register payment accounts, establish account preferences, perform payment transactions, etc.

Mobile device 202 has a display screen 236 and a data entry device 238 (such as a keypad or touch screen, or voice interface). Pursuant to embodiments of the present invention, the customer may use the mobile device 202 to conduct a purchase transaction with a merchant 208. Merchant 208 may be a physical storefront, electronic commerce merchant, or MOTO merchant (or another person or entity). Mobile device 202, in some embodiments, also has a camera (not shown) or other image capture device which allows the mobile device 202 to capture an image or representation of a checkout token 210 (e.g., allowing the mobile device 202 to conduct payment transactions as described in our co-pending application referenced above). Pursuant to some embodiments, as described further herein, the mobile device 202 is also able to capture, obtain or generate a checkout token which may be communicated to a merchant 208 via NFC communication, or via other wireless technologies such as Bluetooth, Bluetooth Low Energy, Wifi, or audio.

Merchant 208 may operate one or more merchant systems 209 to process payments and transactions, including, as will be described, payment transactions pursuant to the present invention (as well as "traditional" or standard payment transactions involving cash, standard payment cards, or the like). Merchant system 209 may be a networked point of sale system (such as for a physical retail location) or it may be a shopping cart system (such as for an electronic commerce or Internet retail location). Merchant system 209 may further be a combination of systems designed to allow a merchant to accept payments for goods or services. In some embodiments, merchant system 209 may be in communication with one or more point of sale devices 212 which have display devices 213 for presenting and receiving information from customers. For example, in the situation where the merchant 208 is a physical retail location, a merchant system 209 may be in communication with a number of different point of sale devices 212 each of which is located at a different checkout lane or location within the store (or in different stores in different geographical locations). Each of the point of sale devices 212 may present, display, or communicate transaction information to customers at the point of sale (or "POS") so that the customer can approve or authorize purchases and present payment for the purchases. Pursuant to some embodiments, as described further herein, a POS device 212 may include an NFC reader device allowing NFC communication between a mobile device 202 and POS device 212. In other embodiments, the POS device 212 may include a Bluetooth or Bluetooth Low Energy or other wireless communication module enabling communications between a mobile device 202 and POS device 212.

As another example, where the merchant 208 is an Internet or other electronic commerce merchant, the merchant system 209 may be a Web server (or a network of servers, some of which may be Internet accessible) configured to process purchase transactions associated with merchant 208. Point of sale devices 212, in such an example, may be a number of remote terminals interacting with merchant system 209 such as, for example, personal computers, mobile devices, or the like that are able to interact with the merchant system 209 via a network such as the Internet. Because embodiments of the present invention are capable of initiating and conducting transactions for both physical and remote types of merchants, the point of sale, point of purchase, or interaction between a buyer and merchant may be referred to as the "point of sale" herein.

The display device 213 could be an LCD (or other display technologies) display (e.g., such as those currently available at many merchants in systems such as the Hypercom 4150 terminal, or the Verifone MX870 terminal or the like). The use of the checkout token 210 in transactions pursuant to the present invention will be described further below. In general, however, the checkout token 210 is used by the transaction management system 230 to match a payment request from a mobile device 202 with a payment authorization request from the merchant 208 to complete a payment transaction using information stored at, or accessible to, the transaction management system 230.

In a typical example transaction, a customer may purchase products or services from the merchant 208 by first selecting mobile payment as a payment option, performing an authentication process with a payment application on a mobile device 202 (or via a Web browser interacting with transaction management system 230), obtaining or generating a checkout token 210, communicating the checkout token 210 (via an NFC communication) to the merchant 208, receiving transaction details and a payment account list or list of preferred or eligible accounts from the transaction management system 230, selecting a payment option on the mobile device 202, and submitting a customer payment authorization request to a transaction management system 230 over a network 201.

The selection of a payment option involves receiving information identifying one or more payment accounts available to the customer. The available payment accounts may be those specified by the customer during a registration process such as the process described further below in conjunction with FIG. 3. Pursuant to some embodiments, the presentation of the different payment account options may include applying one or more rules or preferences to a list of available payment accounts so that the customer is presented with the account(s) that are best suited or available for the current transaction. The customer selects the payment account (or accounts, in the case of a split tender transaction) to use and the information is transmitted to the transaction management system 230. In some embodiments, all of the customer's available payment accounts may be displayed to the customer after the customer has been authenticated. In some embodiments, the transaction management system 230 may select the best payment account or accounts to use to complete the transaction based on preferences specified by the user. This is especially useful in situations where the user's mobile device 202 cannot connect to external systems like the transaction management system 230.

In some embodiments, the list of accounts later received from the transaction management system (after it processes the customer transaction lookup request) may include additional metadata or information associated with each payment account (e.g., such as the current available account balance, any special offers available if the account is used in the current transaction, etc.). In some embodiments, the list of accounts later received from the transaction management system may include fewer accounts based on the application of rules at the transaction management system (e.g., such as the application of one or more customer, merchant or system rules). For example, a rule may specify that a specific payment account not be used for low dollar value transactions. In such a case, that specific payment account would not be included in the list of accounts sent from the transaction management system in response to the customer transaction lookup request. Put another way, the list of payment accounts received from the transaction management system after it processes the customer transaction lookup request may be a subset of all the accounts the customer has registered.

After the merchant 208 receives the checkout token from the mobile device 202 (via the NFC communication link between the mobile device 202 and the NFC reader), the merchant 208 transmits a merchant payment authorization request message to the transaction management system 230 over a network 220. Pursuant to some embodiments, the routing of the message to the transaction management system 230 includes mapping to or identifying the transaction management system 230 by using the checkout token (e.g., based on the BIN, PAN or other information in or associated with the checkout token received from the mobile device 202). The transaction management system 230 matches the customer payment authorization request (received from the mobile device 202 over network 201) with the merchant payment authorization request (received from the merchant 208 over network 220) by using the checkout token 210.

In some embodiments, the transaction management system 230 then transmits a customer payment confirmation request message to the customer's mobile device 202, enabling the customer to have a final opportunity to confirm or cancel the payment transaction. For example, the customer may be prompted to "confirm" or "cancel" the payment transaction. The prompt may provide additional information about the transaction and the selected payment account so the customer can have detailed information about the transaction before selecting "confirm" or "cancel". In some embodiments, customers may be given the opportunity to set preferences or otherwise configure the mobile payment application to enable or disable certain messages or transaction steps. As a specific example, customers may be given the opportunity to receive (or not receive) customer payment confirmation request messages.

Once the final confirmation to proceed with the payment has been received from the customer's mobile device 202, the transaction management system 230 creates an authorization approval request message for transmission through one or more payment processing network(s) 232 to cause the authorization, clearing and settlement of funds for the transaction. This request message includes the transaction details, such as the amount of the transaction or other information, from the merchant payment authorization request (received from the merchant 208) and the actual payment credentials associated with the payment account selected by the customer. The actual payment credentials may be obtained by using the payment account selection information and performing a lookup of actual payment account credentials previously stored in a database or location accessible to the transaction management system 230. The authorization approval processing may be performed using standard financial authorization processing over one or more payment processing networks 232 (e.g., such as the VISANET® network operated by Visa, Inc., an Automated Clearing House system such as NACHA, PayPal®, or the like). Once the availability of funds is confirmed, the transaction management system then sends a merchant payment authorization response message to the merchant 208 so the transaction can be completed at the point of sale 212, and a customer payment authorization response message to the customer's mobile device 202.

Figure 3:
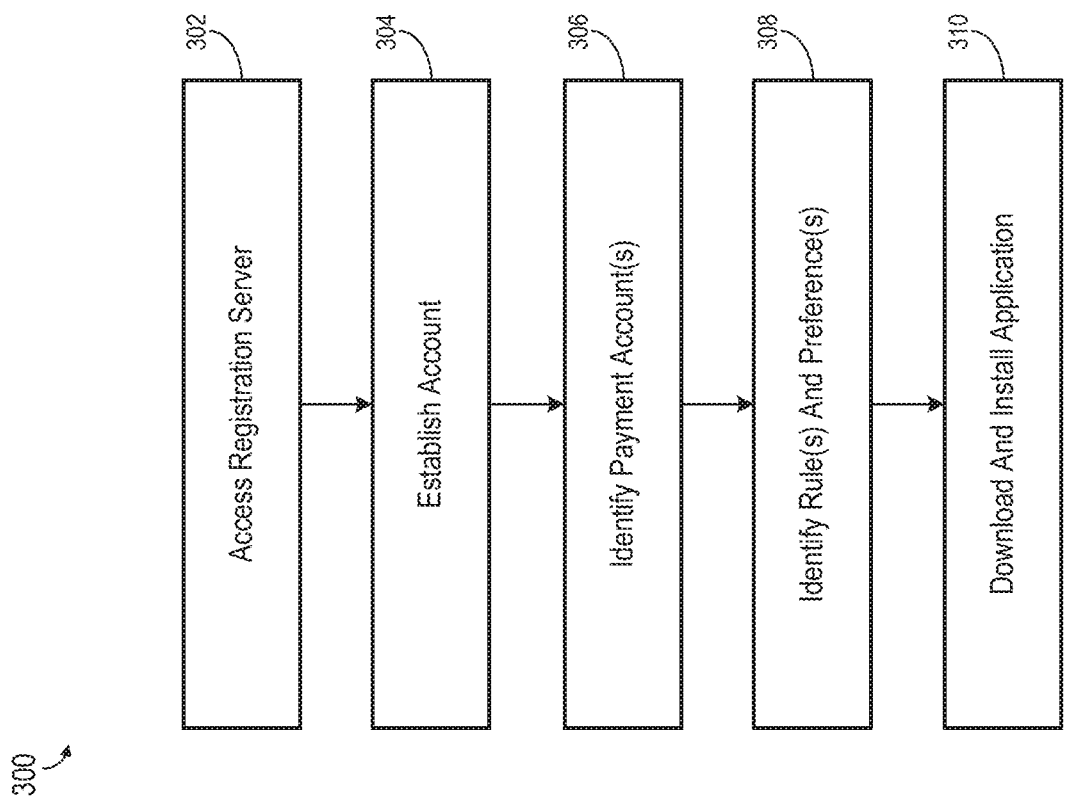
FIG. 3 is a flow diagram depicting a customer registration process pursuant to some embodiments.

Pursuant to some embodiments, before a customer can use a mobile device (such as the mobile device 202 of FIG. 2) to conduct a purchase transaction using the present invention, the customer must perform a registration process such as the process described in conjunction with FIG. 3. Data collected or provided in association with the process 300 may be stored at or be accessible to one or more databases associated with the transaction management system 230.

The registration process 300 of FIG. 3 begins when a customer first (at 302) interacts with a registration server (which may be a component of, or related to, transaction management system 230 of FIG. 2) to initiate a registration process. For example, the customer may operate an Internet browser (either on a mobile device or another computing device) to access a registration Web page associated with the registration server. The registration Web page may request the customer provide some identifying information to begin the account creation process. For example, a customer may provide name, address and other contact information as well as contact preferences, including one or more email addresses and phone numbers. A customer identifier or other unique record (or records) may be established in a database and may be used to uniquely identify the customer. The customer identifier may be an alphanumeric identifier assigned by the transaction management system 230 or may be information based on or provided by the customer (e.g., such as a mobile phone number or identifier associated with a mobile device 202).

Processing continues at 304 where the customer establishes an account. In some embodiments, the account creation includes providing contact and identifying information associated with the customer, as well as information identifying one or more mobile device(s) from which the customer wishes to make transactions. Each mobile device 202 may, for example, be identified by its phone number and/or other unique identifier(s) (such as a hardware serial number, an ASIN, a UUID in the case of an iPhone, a component serial number such as a CPU serial number, a unique identifier created from a series of configuration settings on the device, or the like). In some embodiments, where the customer registers from a browser on their mobile device, or by first downloading a payment application having a registration module onto their mobile device, the system may capture unique identifying information associated with the mobile device (e.g., such as a hardware serial number, an ASIN, a UUID or other device identifiers).

Processing continues at 306 where the customer provides information about one or more payment devices or payment accounts that the customer wishes to have associated with the payment system of the present invention. For example, the customer may enter information about one or more credit cards, debit cards, gift cards, bank accounts, checking accounts, or the like. The information about each account includes the actual payment credentials or sufficient information to process a transaction using the account. For example, with respect to a credit or debit card, the information may include: the primary account number (or PAN), the expiry date, and the verification code. With respect to a bank account, the information may include: the routing number and the account number. Other information, such as bank or issuer information may also be entered at 306. Some or all of the information may be stored in one or more fields of one or more database tables accessible by the transaction management system.

Processing at 306 may also include processing for the customer to provide information about loyalty accounts, membership accounts, reward accounts or the like, as well as information used by the transaction management system to manage offers or discounts available to the customer. For example, the customer may also register one or more discounts or offers in an offer database, and/or one or more loyalty program accounts stored in one or more databases accessible to the transaction management system. In some embodiments, the discounts or offers stored or accessible in a database may be "clipped" or "accepted" by the customer by browsing a set of offers or discounts available to the customer (e.g., by interacting with an offer or discount selection system on their mobile device, or via a Web browser). Once an offer or discount has been accepted by the customer, details of the offer or discount may be stored in one or more database records associated with the customer. Each offer or discount may be identified by an offer identifier and be associated with the customer (e.g., via a user identifier and a specific mobile device identifier) and may have offer details, preferences or rules, other offer metadata, and possibly a balance.

During the customer registration process (and subsequently, during account update transactions), the customer may provide information about one or more loyalty or reward accounts that the customer wishes to make available via their mobile device. This account information may be stored in a database accessible to the transaction management system. For example, each loyalty account associated with a customer (e.g. via a user identifier and/or a specific mobile device identifier) may have account details and one or more rules or preferences associated with the use of the loyalty account.

Pursuant to some embodiments, the data associated with the actual payment accounts of a customer are securely stored in a PCI compliant database. In some embodiments, by securely storing payment card data (including expiry date and verification codes), payments made using the present invention may qualify for reduced interchange as "card present" transactions. Pursuant to some embodiments, a customer may add, remove or update account information as needed.

As an illustrative example, a customer may enter information about several loyalty or reward accounts, such as a Kroger shopping card number, a CVS discount card number, and a Groupon account number and password. Other information may be provided to allow the identification and access to one or more loyalty, reward or other accounts associated with the customer. By providing this account information, the customer is able to access or interact with the registered loyalty or reward accounts using the mobile wallet as will be described further below. The customer may also provide information identifying one or more discounts or offers. This information may be provided during processing at 306, or it may be provided during subsequent processing in which the customer clips or otherwise selects from a variety of offers or discounts that are available. Once the customer has clipped or otherwise selected an offer, details of the offer may be associated with the customer's account information and be accessible to the transaction management system during transaction processing of the present invention.

Processing continues at 308 where the customer may optionally establish one or more preferences or rules associated with the use of one or more of the accounts entered at 306. For example, the customer may designate one of the accounts as the "primary" or default account. Other rules and preferences may also be set to enable accounts to be selected and used in an efficient and logical manner. For example, a customer may specify priorities or other account-based rules to indicate how a particular payment account should be treated with respect to other payment accounts. A customer may also specify spend limitations or balance requirements that govern how and when a payment account is to be presented as an option. A customer may also specify the order in which accounts are displayed on the mobile phone, based on what merchant they are purchasing from, or the funds available in each account, or the rewards received for using each account.

In some embodiments, a rule (such as a customer-specified rule), may cause a payment process to proceed more quickly, or with fewer customer steps, or how to handle payment account selection if the mobile device 202 cannot connect to the transaction management system 230 to enable the customer to interactively specify the payment account(s) to use to complete a transaction. For example, a customer may specify that when making a purchase (or a certain type of purchase, such as a purchase below a certain dollar amount) at a specific merchant, that a default payment account be used. In such situations, a purchase transaction using the present invention may proceed without need for the customer to select or confirm the selection of a payment account—it is done automatically by application of the customer-specified rule.

For example, in some embodiments, the customer may have specified one or more "autopay" preferences which are applied when certain transaction conditions apply. As an illustrative example, a customer may have specified that a specific credit card (registered for use in the mobile payment system) is to be used whenever the customer uses the mobile payment system to conduct transactions. In the event that such an "autopay" preference is established, the customer need not select a specific payment account for use in individual transactions; instead, the default (or "autopay") account is automatically selected by the mobile payment system and used for the transaction. As another example, the customer may specify one or more autopay preferences for transactions that meet specific conditions. As an illustrative example, a customer who has a Starbucks prepaid card may specify that the Starbucks prepaid card be used as the default payment account for any transaction at any Starbucks store. In such an embodiment, the fact that a transaction is being conducted at a Starbucks store may be determined based on information obtained during the transaction (e.g., such as from information received by the transaction management system from the merchant after the merchant receives a checkout token from the mobile device). In some embodiments, information received from the mobile device may also be used to identify the merchant or location (such as, for example, using location information received from the mobile device). The merchant information is then compared to stored preference information and rules, and a determination is made that the customer has specified an autopay rule that applies to the transaction at Starbucks and that the rule indicates that the transaction should be completed using the Starbucks prepaid card.

Those skilled in the art will appreciate, upon reading this disclosure, that a wide variety and type of account-level rules may be specified to allow a customer to manage how (and when) payment accounts are presented as payment options. Further, the transaction management system may also store information associated with other levels or types of rules that are applied to transactions to determine which payment account(s) are available for use in any given transaction. For example, in some embodiments, a hierarchy of rules may be defined which include a global set of rules defined by (i) a partner or entity operating the system of the present invention, (ii) issuing partners participating in the system, (iii) acceptance partners participating in the system, (iv) customers of the system, (v) specific devices of customers of the system, (vi) acceptance locations (or merchant locations) participating in the system, and (vii) acceptance points (or specific point of sale devices) participating in the system. For example, an operator of the present invention may specify the types of payment tender that may be supported by the system (e.g., the operator may configure the system to allow credit card and debit card payment accounts, but to not support ACH transactions). In some embodiments, these partner level rules may be inherited by all of the other (child) entities by default (e.g., a partner rule that ACH transactions are not supported is inherited by all participants in that partner's system). These hierarchical rules may be stored at or accessible by the transaction management system and may be enforced during transactions such that for a given transaction, multiple rules may be consulted prior to determining which of a customer's set of registered payment accounts is available for use in a specific transaction at a specific merchant and point of sale device. Those skilled in the art will also recognize that the databases accessible to the transaction management system storing information about payment accounts, loyalty accounts, coupons, offers, and payment rules may be controlled and managed by entities other than the entity controlling and managing the transaction management system 230.

As more specific illustrative examples, a set of rules may be defined by an issuer of the mobile payment application. The issuer may define which tender types are supported by the mobile payment application, as well as metadata around each supported tender type, which can be used to drive business rules when a customer adds payment accounts to their preferences and when the customer conducts transactions using the mobile payment application. The customers and the mobile devices associated with the issuer inherit these issuer rules by default, and the issuer can define in which order the tender rules will appear on mobile devices at different acceptance partners. These tender rules and ordering rules can be defined by the items involved in a transaction, the total purchase amount of a transaction, offers, discounts or loyalty accounts associated with a transaction, etc.

As described herein, customers can define customer-specific rules within the rules of their issuer. For example, customers can associate specific payment instruments/accounts with specific merchants (or acceptance partners) and locations. For example, a customer may set a rule to always use their Target Red Card when making purchases at any Target location. Customers can also define rules around devices. For example, a customer can define what payment accounts or instruments are available for each mobile device associated with their account or wallet. A customer could, for example, have two or more mobile devices associated with the system of the present invention, and one of those mobile devices could have rules associated with it that allow it to only be used with one set of payment accounts, while a second mobile device could have a different set of payment accounts associated with it. As a specific, illustrative example, a parent could have a primary mobile device for their use, and a secondary mobile device for a child's use. The customer may also establish one or more rules associated with purchase thresholds and other usage parameters as described herein.

Merchants (or acceptance partners) can establish rules regarding which tenders are accepted within the rules set at the issuer level. For example, a merchant may establish rules regarding discounts and special offers associated with specific tender types. For example, a merchant may define a rule that for purchases greater than $50, a customer will receive a $10 discount if the merchant's gift card is used. These merchant or acceptance partner rules may be automatically inherited by acceptance locations and acceptance points of the merchant. In some embodiments, acceptance locations and acceptance points may override these rules and define their own rules of acceptance within the universe of allowed tenders set by the issuer or the merchant.

As a specific illustrative example of this hierarchical application of rules, an example of a customer process to add a new payment account will now be presented. In the example, the issuer of the mobile payment application has defined or established a set of rules relating to the supported tender types of mobile applications issued by the issuer. The set of rules is stored at, or accessible to, the transaction management system in one or more databases which include one or more lists of supported tender account types (e.g., credit, debit, gift, or the like) and tender network types (e.g., Visa®, MasterCard®, American Express®, Discover®, or the like). When a customer attempts to add a payment account to their list of payment accounts, the transaction management system retrieves the relevant tender type policy from the issuer, and the system determines whether the new payment account satisfies the policy rules. For example, if an issuer specifies that the Diners Club® network is not supported, and if the customer attempts to add a Diners Club payment account to their list of accounts, the transaction management system may alert the customer that the account cannot be added. By allowing such a hierarchical application of rules, preferences and policies, embodiments allow improved selection of payment accounts, discounts, loyalty accounts and other transaction controls during transactions involving the present invention.

In an illustrative example, a customer may specify the following account preferences: (i) reduce the use of credit, and (ii) reduce transaction fees. As a further illustrative example, the customer may also specify rules to be applied when specific payment accounts are analyzed for use in a given transaction: (i) a Starbucks gift card balance should be used where possible (having been assigned the highest priority), (ii) a checking account or the debit card associated with the checking account should be used as the second highest priority (and further, to specify not to use the checking account if a transaction would reduce her balance to below $1,000), and (iii) a credit card should be the final payment option, having the lowest priority.

When a customer, in an illustrative example, uses a mobile device to conduct a transaction using the present invention, the transaction management system will compare the rules and preferences the customer has specified to the details of the transaction to recommend which payment account(s) are available for the transaction. For example, if the customer uses the mobile device to purchase a cup of coffee at Starbucks, the transaction management system will inform the customer that the payment account associated with Starbucks (e.g., a Starbucks gift card) may be used for the purchase. In this manner, customers having a variety of payment accounts may be presented with choices of payment options that are based on their overall preferences and usage objectives. Further, a payment account that is unavailable or unsuitable for a particular transaction may be identified as such by the transaction management system so that the customer need not be presented with that payment account as an option (e.g., if a customer is purchasing gas at a gas station, the customer's Starbucks gift card will not be available as a payment option for that transaction). Further details of how payment accounts are presented to a customer during a transaction are provided below in conjunction with FIG. 5.

In some embodiments, processing may continue at 310 if the customer operates or uses mobile devices that are capable of operating an application that is associated with the present invention (such as an iPhone® or an Android® phone or Windows® phone). At 310, the customer is prompted to download and install an application on their mobile device. The application allows the customer to operate their mobile device to quickly and easily conduct payment transactions pursuant to the present invention. For phones or devices that are not capable of running such an application, a link or Web page may be created or provided to the customer that may be accessed via a mobile phone browser, so that the customer can conduct payment transactions pursuant to the present invention.

Once a customer has established an account and registered one or more payment accounts (and, optionally, one or more loyalty, reward or other accounts and/or information about desired offers and discounts) with the transaction management system, the customer may utilize the system of the present invention to conduct purchase transactions at merchants that support transactions of the present invention.

Figure 4:
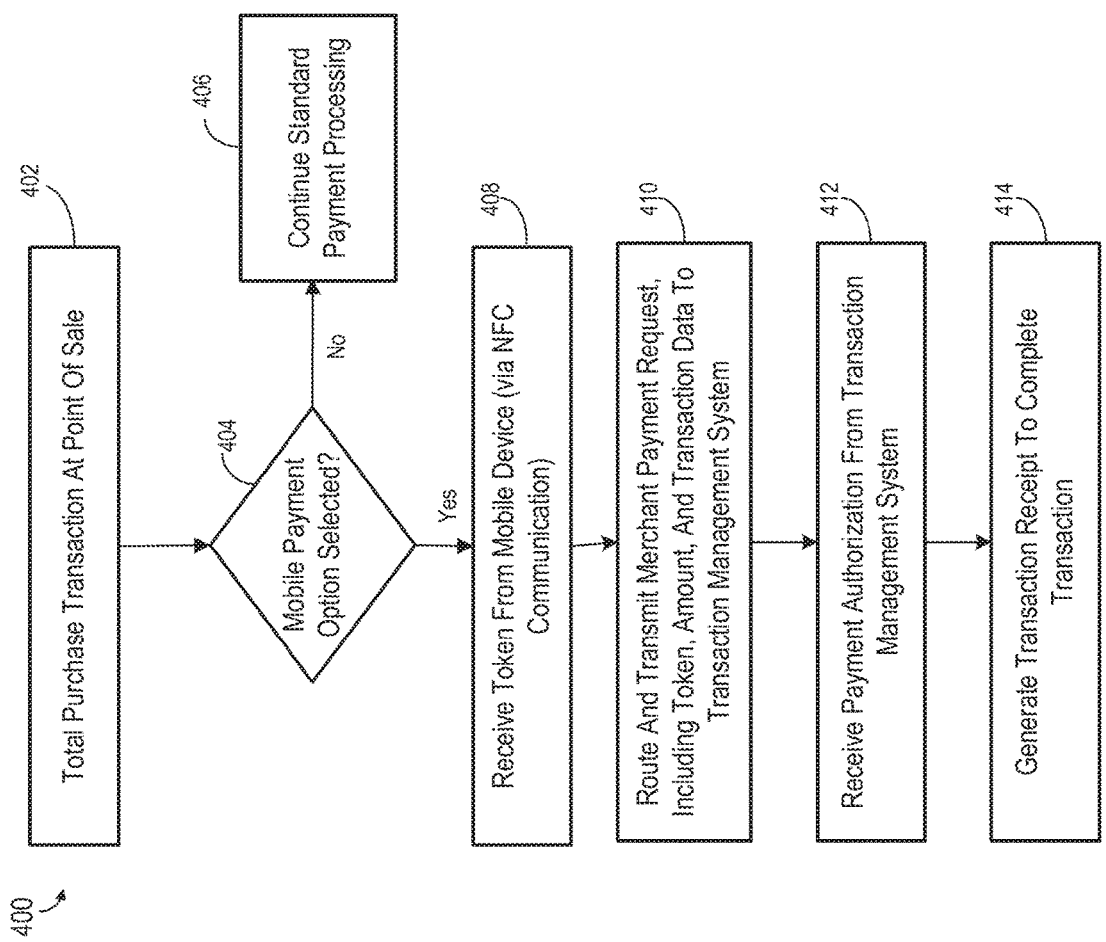
FIGS. 4-6 are flow diagrams depicting a transaction process pursuant to some embodiments.
Figure 5:
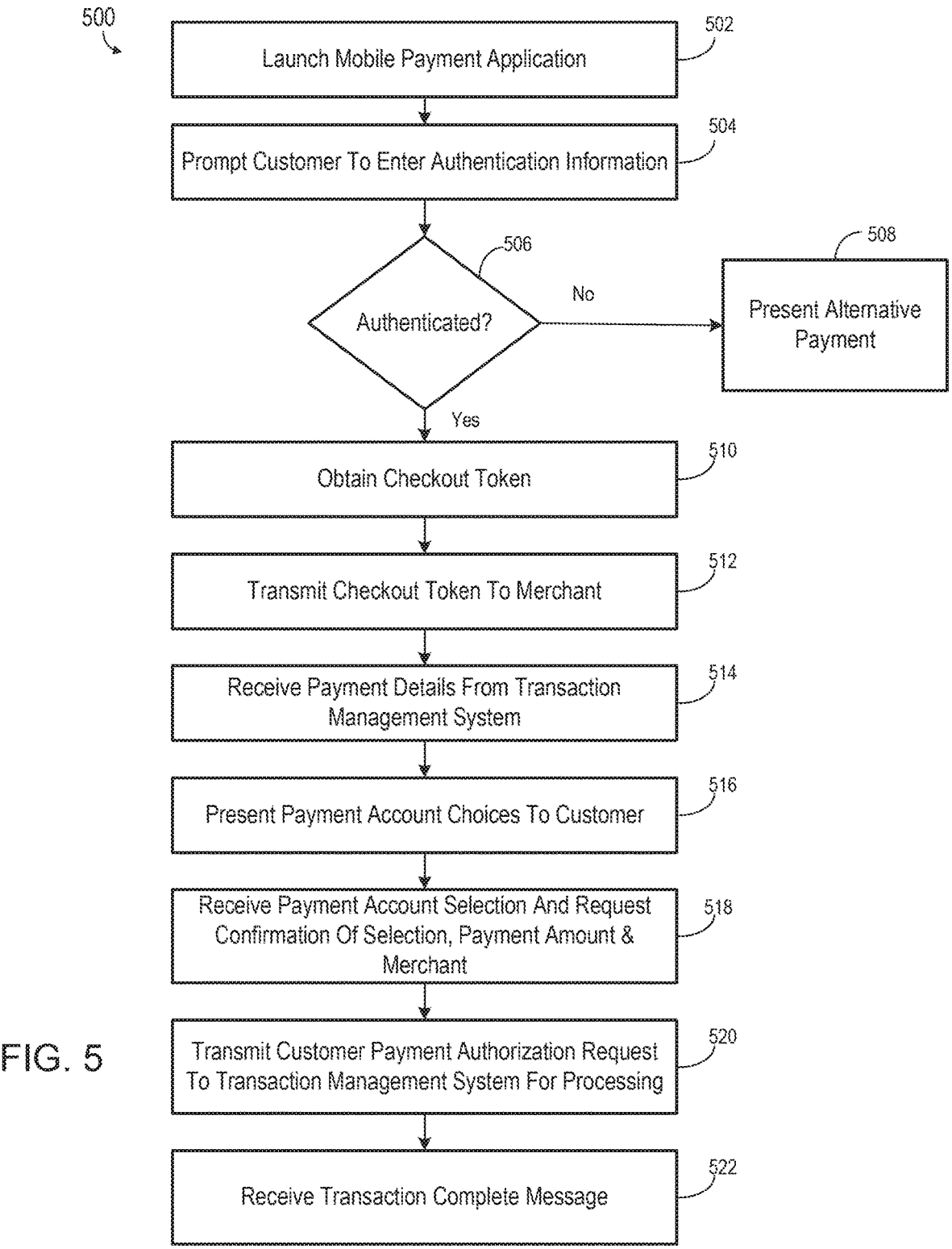
Figure 6:
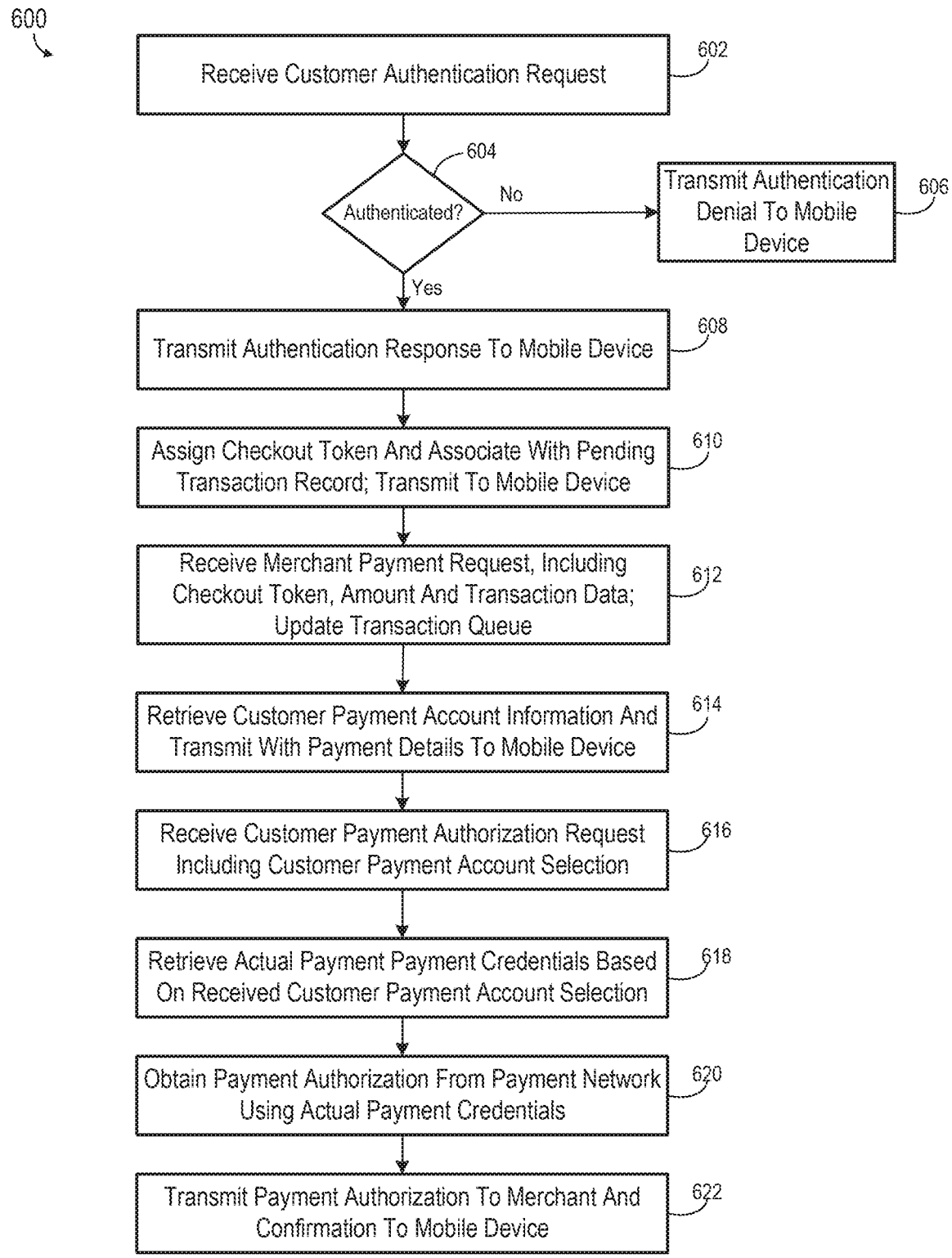

An illustrative transaction process 400 will now be described in conjunction with FIGS. 4-6 (while also referring to the components of system 200 of FIG. 2). FIG. 4 depicts a transaction process from the perspective of a merchant (such as merchant 208), FIG. 5 depicts a transaction process from the perspective of a mobile device (such as mobile device 202), and FIG. 6 depicts a transaction process from the perspective of transaction management system (such as system 230 of FIG. 2). In general, the three transaction processes are performed in parallel or in conjunction with each other to perform a payment transaction pursuant to some embodiments of the present invention. Each of the transaction processes begin when a customer (who participates in the payment system of the present invention) is done shopping or is otherwise ready to make a purchase at a point of sale. For example, the processes may begin once a customer has selected goods or services to purchase and has taken them to a point of sale to purchase them. The point of sale may be a checkout lane at a retail store, an electronic shopping cart at an ecommerce store, a clerk or waiter at a restaurant, a gas station pump, or the like, or it may be one person using the present invention to pay another person.

Reference is first made to FIG. 4, where a transaction process 400 is shown. The process of FIG. 4 is generally presented from the perspective of a merchant. For example, transaction process 400 may be performed by or at a merchant 208 and may be performed using software or systems associated with a merchant 208 such as, for example, merchant system 209 and point of sale device 212, and more particularly, pursuant to some embodiments, where the point of sale device 212 includes or is an NFC, Bluetooth, or other wireless reader. Processing begins at 402 where the goods or services are rung up to total the purchase. Processing continues at 404 where the point of sale device 212 (or the clerk) prompts the customer to select a payment option, and a determination is made whether a mobile payment option is selected. If the mobile payment option is not selected, processing continues at 406 where standard payment processing or processing to complete the purchase using another payment option occurs.

If the mobile payment option is selected, processing continues at 408 where the merchant system 209 receives a checkout token from the mobile device via an NFC communication between the mobile device 202 and an NFC reader associated with the point of sale device 212. The NFC reader may receive the checkout token (and other information from the mobile device 202) pursuant to an NFC payment scheme, such as pursuant to Visa® Paywave, MasterCard® PayPass, Discover® Zip, or other NFC communication schemes, such as those supported or promoted by American Express®, Softcard®, or the like. Further, the NFC reader may receive the checkout token using NFC passthrough mode, a mode for interacting with an NFC reader where a mobile device can interact with a custom application on an NFC reader to facilitate data interchange between the mobile device 202 and the NFC reader. The data transmission between the mobile device 202 and the NFC reader may comply with other standards, such as the NFC Data Exchange Format ("NDEF") available at www.nfc-forum.org, or the like.

The checkout token and other associated information may be presented to the point of sale device 212 using any one of the common NFC payment schemes, including the Visa Paywave scheme, the Mastercard PayPass scheme, the Discover Zip scheme, American Express' ExpressPay scheme, the Google Wallet scheme, or using the so-called "NFC Pass-through mode", a mode for interacting with an NFC payment terminal where a mobile device can interact with a custom application on the payment terminal supporting Pass-through mode to facilitate data interchange between the mobile device and the payment terminal. Such an approach provides a number of desirable benefits. For example, when the NFC reader is activated it starts to poll for an NFC supported card or emulated card (e.g. mobile device) when the reader detects a card it will request an Application Identifier (AID) from the emulated card. When leveraging pass-through mode, the reader can receive an AID specifically assigned to the issuer of the payment application on the mobile device and the point of sale device 212 (or merchant systems) can drive specific business logic for the purposes of routing the data transmitted from the mobile device to the appropriate system. This approach can be used without impacting current schemes like PayWave, Zip, and PayPass as well. If the initial AID returned is not recognized, the NFC terminal will then fail over to one of the existing NFC schemes used for traditional NFC payments that may not be related to the scheme assigned to the payment application invoked by the user. In some embodiments, existing NFC schemes may be leveraged pursuant to the present invention by properly encoding the checkout token data and to create a mobile application that would pass an AID that is expected per the "common NFC schemes" listed above for the purposes of transmitting the checkout token data. By properly formatting the checkout token in this manner, the data can be made available to the appropriate system (POS, Switch, Payment Processor, etc) via an existing NFC scheme after read record event.

In some embodiments, the checkout token is received by the NFC reader in a field of a standard NFC message format, such as in a field designated for carrying information such as a PAN. As described further herein, the checkout token, in some embodiments, may be formatted as a PAN, allowing the merchant system 209 to process the message using standard processing methods (e.g., without requiring additional or modified software). For example, in some embodiments, the checkout token may be presented in the message received over the NFC communication link as a 16 digit PAN which may then be used to identify that the transaction is a mobile payment transaction pursuant to the present invention and to route a merchant payment authorization request message to the transaction management system 230.

In some embodiments, the checkout token information is used to make a routing determination at 410 to transmit and route a merchant payment authorization request (including, for example, the checkout token, the transaction amount and other transaction data) to a transaction management system 230. In some embodiments, the routing determination may be made by the point of sale device 212 or other components of the merchant system 209 such as a merchant payment switch.

Many merchants 208 operate one or more payment switches to route different types of transactions (such as credit, debit, gift, loyalty, and stored value card transactions) to different authorization entities. Pursuant to some embodiments, a merchant payment switch may receive the information obtained by the NFC reader and use information in the message (including the checkout token) as an identifier to route the transaction involving the mobile device to the transaction management system. For example, the checkout token may be formatted as a PAN, and the merchant payment switch, upon receiving a transaction involving the checkout token, could determine that the checkout token (e.g., formatted as a PAN) has a format or a value such that the transaction should be routed to a particular transaction management system 230. Examples of merchant payment switches include those provided by ACI Worldwide, Inc., including its Base24 payment switch. The merchant payment switch (or other device or system used to make the routing decision of the present invention) may be an on-premises component (located at the merchant location) or it may be a hosted component (located remote from the merchant location). The merchant payment switch (or other device or system used to make the routing decision of the present invention) may also be performed by another entity (such as, for example, a merchant acquirer processor, a payment network, a gateway provider, or the like).

Use of the merchant's payment switch to route the transaction to the transaction management system 230 provides a number of desirable benefits. For example, a payment switch typically receives authorization request messages from a point of sale system or payment terminal 212, and then formats the authorization request in the format appropriate for a particular authorization entity, typically including a PAN or other payment account identifier to be used by the authorizing entity to determine which payment account should be used to pay the merchant 208 for the transaction. For example, the authorization message for a gift card transaction may be formatted differently than the authorization message for a credit card transaction. Given that the authorization entity for a gift card transaction may be different than the authorization entity for a credit card transaction, the payment switch also handles all of the details around delivering the message to the appropriate authorization entity, including but not limited to security credentials to pass to the authorizing entity, merchant identifiers to associate the transaction with a particular merchant, as well as the communication technology to use to deliver the authorization message, which could be TCP/IP, dialup, or other communication technologies.

In addition, the payment switch is also typically responsible for creating and managing reporting and settlement information so that the merchant 208 can keep track of the payment instruments that were used to pay for the goods associated with a particular in store purchase transaction. The payment switch might create a report specifying that for point of sale transaction 123 on Mar. 5, 2015 at store number 12, Visa credit card number 1111333355557777 with expiration of 2/18 was used to pay for the transaction, or that for transaction 124, merchant gift card number 0000222244446666 was used to pay for the transaction.

As a result, in embodiments where a merchant's payment switch is used to make the routing determination of the present invention, although the PAN used as a checkout token might conform to the specification for a payment card PAN (such as a debit card PAN or a credit card PAN), ultimately the authorization for the payment may be completed using a completely different payment account identifier than the PAN used for the checkout token. This may be the case because the payment switch upon reading the PAN—say it is 4111333355557777 which could be a PAN for a VISA credit card—might discover that this PAN falls within the range of PANs designated for use with the present invention, and that the PAN and all information associated with the PAN including pending transaction details should be routed to the transaction management system 230.

The merchant payment switch (or other components or systems associated with the merchant 208) use the checkout token (as well as other transaction data from the point of sale device 212) to create and transmit a merchant payment authorization request at 410, including the checkout token received from the mobile device 202, a transaction amount, and other transaction data (such as a terminal identifier, date, time, enhanced transaction data, etc.) to a transaction management system 230 (e.g., via a network such as network 220). The merchant payment authorization request is then used by the transaction management system 230 (as will be described further below in conjunction with FIG. 6), to create a pending transaction in a merchant transaction queue.

Processing at the merchant 208 continues at 412 where the merchant system 209 receives a merchant payment authorization response message from the transaction management system 230. The merchant payment authorization response message is generated by the transaction management system 230 after certain customer-related processing steps (described in FIG. 5) and certain transaction management system-related processing steps (described in FIG. 6) have been completed, and after one or more payment accounts selected by the customer (using their mobile device 202) or one or more payment accounts selected by the transaction management system 230 through a rule or preference have been authorized for the purchase transaction. Processing continues at 414 where the merchant system 209 is operated to cause the generation of a transaction receipt to complete the transaction.

Of note in the merchant processing described above is that at no point, in some embodiments, does the customer provide actual payment account data to the merchant 208. Those skilled in the art, upon reading this disclosure, will appreciate that such a process has desirable fraud and other benefits.

Pursuant to some embodiments, the process of FIG. 4 (and similarly, for FIGS. 5 and 6) may be modified to allow the merchant to transmit a merchant payment authorization request before the transaction total has been calculated. Such an embodiment generally proceeds as follows. First, at the beginning of every new checkout event, the merchant transmits a merchant payment authorization request to the transaction management system 230. This merchant payment authorization request contains information identifying the checkout token received from the mobile device 202, the merchant 208 and, in some embodiments, a point of sale terminal identifier and/or a unique transaction identifier, but it contains no amount due information, as the clerk has either not yet started to ring up the goods, or is in the middle of ringing up the goods. In response to this merchant payment authorization request, the transaction management system 230 updates information in a pending transaction queue or record associated with the checkout token, awaiting further transaction information from the merchant 208.

Such embodiments allow the transaction management system 230 to retrieve the customer's available payment accounts that are appropriate for the merchant and customer based on any available rules.

Further, in some embodiments, by transmitting the merchant payment authorization request early in a transaction (before calculation of a transaction total), the transaction management system 230 has an opportunity to provide any relevant offers, coupons or loyalty incentives to the customer. For example, if the customer has registered her loyalty credentials with a particular merchant (such as the example introduced above, where Jane shops at Starbucks frequently), then before the total amount due is displayed, the merchant may want to cause an offer or promotion on the customer's mobile device that are appropriate for or tailored to the specific customer. This allows for advertising and promotional offers to be displayed to the customer before they finish the checkout process.

In general, a transaction process in which the merchant payment authorization request message is generated prior to the calculation of a total amount due proceeds as follows. First, the merchant payment authorization request message (including the checkout token received from the mobile device 202) is generated and transmitted to the transaction management system 230. The request does not include the total amount due (but includes the checkout token and information identifying the merchant and/or the point of sale terminal or checkout lane). The transaction management system 230 updates a pending transaction record associated with the checkout token.

The transaction management system 230 matches the information (using, for example, the checkout token) with the pending transaction data (which, at this point in the transaction, may simply include information identifying the customer). The transaction management system 230 returns information to the mobile device 202 including information identifying the merchant and possibly a list of available payment accounts (but no amount due as it has not yet been communicated to the system 230). Any targeted offers or advertisements may also be delivered to the mobile device at this time. While the customer is waiting for the transaction total, a message may be displayed on the mobile device 202 informing her that the device is "waiting for an amount due" (or similar message). After the merchant calculates the transaction total, the merchant transmits the total in an updated merchant payment authorization request message to the transaction management system 230. The system 230 uses this information to update the pending transaction record and then causes a message to be transmitted to the mobile device 202 to update the mobile device 202 with the total amount due (and may also include information about a list of available payment accounts that may be used in the transaction). The mobile device 202 may be updated to display the total as well as any loyalty savings (if any were earned in the transaction) as well as the list of available payment accounts. The customer then selects her desired payment account(s) to complete the transaction as normal. Those skilled in the art will appreciate that other modifications may be made to some or all of the processes shown herein to achieve different transaction flows.

Reference is now made to FIG. 5, where a further transaction process 500 is shown. The process 500 is shown from the perspective of a customer operating a mobile device. For example, transaction process 500 includes a number of steps that may be performed by a customer operating a mobile device (such as the device 202 of FIG. 2) to complete transactions pursuant to the present invention. As described above, the process 500 may be performed in conjunction with the process 400 performed by the merchant 208. Processing begins at 502 where a customer who is a participant in the mobile payment program of the present invention launches a mobile payment application on their mobile device 202. The mobile payment application may be an "app" or computer program code stored on the mobile device 202, or, in some embodiments, the mobile payment application may be accessed by pointing a Web browser associated with the mobile device 202 to a Web page associated with a mobile payment application over the Internet, or by moving the phone in proximity to a payment terminal device such as an NFC payment terminal or Bluetooth enabled payment terminal associated with the point of sale device 212. For the remainder of this discussion of process 500, it will be assumed that the mobile payment application is an application stored on the mobile device 202 (but such discussion is not intended to limit the application of the present invention to such an embodiment).

Processing continues at 504 where the customer is prompted to enter authentication information. For example, the customer may be prompted to enter information such as a user identifier, a password, a biometric identifier such as a fingerprint, iris scan or voiceprint, or other credentials into the mobile device 202. Processing at 504 may also include collecting or generating device-related information for use in authenticating the customer. The customer authentication information, as well as any device-related information, may be transmitted to the transaction management system 230 (e.g., over a network 201) for authentication by the transaction management system 230 (as described further below in conjunction with FIG. 6). In some embodiments, authentication may occur locally on the mobile device 202. A determination is made at 506 whether the authentication passed or failed (e.g., based on a response received from the transaction management system 230). If the authentication failed, processing may continue at 508 where the customer is informed of the failure and is either prompted to use a different form of payment or to reattempt the authentication process.

Processing continues at 510 if the authentication processing is successful (that is, if the customer and the device have successfully been identified by the transaction management system 230), where the transaction management system 230 assigns, generates or otherwise provides a checkout token for use in the transaction to the mobile device 202. In some embodiments, the checkout token may be partially or fully generated under control of the mobile application in response to information provided by the transaction management system 230. In some embodiments, the checkout token may be generated and delivered to the mobile device 202 at any time in advance of the customer conducting an actual transaction, and the checkout token in these embodiments would be stored on the mobile device 202. Processing at 510 may also include processing by the transaction management system 230 to create a pending transaction record in a transaction queue for use in conducting the transaction.

Processing continues at 512 where the customer presents (or "taps") the mobile device 202 to an NFC reader at the merchant 208. Pursuant to some embodiments, information is transmitted from the mobile device 202 to the NFC reader over an NFC communication interface, and the information may include the checkout token. In some embodiments, the checkout token is passed to the NFC reader in a message formatted pursuant to an NFC payment scheme (such as the Visa® Paywave, Discover® "Zip", or the MasterCard® PayPass schemes). Further, in some embodiments, the checkout token may be formatted as a PAN and passed in a field of a message typically used for a PAN in a payment transaction (although as discussed herein, the checkout token may be formatted in other ways and included in other fields of a message).

Processing continues at 514 where the mobile device 202 receives the transaction details and, in some embodiments, a list of available payment accounts from the transaction management system 230. For example, at 514, the mobile device 202 may receive a message including a number of data elements, including data associated with the current transaction (such as the transaction total, the merchant name and information, and other transaction details) as well as data identifying the customer's payment account(s) that may be used for the current transaction, and information about the order in which the payment accounts should be presented to the customer, as well as marketing messages or advertisements that might be displayed in proximity to the payment account information. The data identifying the customer's payment account(s) may include proxies or non-sensitive identifiers used by the transaction management system 230 to identify each account (rather than the actual payment credentials). Further, the data may include information about current account balances, loyalty programs, discounts, marketing messages, or the like associated with one or more of the available payment accounts, or associated with the overall mobile wallet account.

Figure 8A:
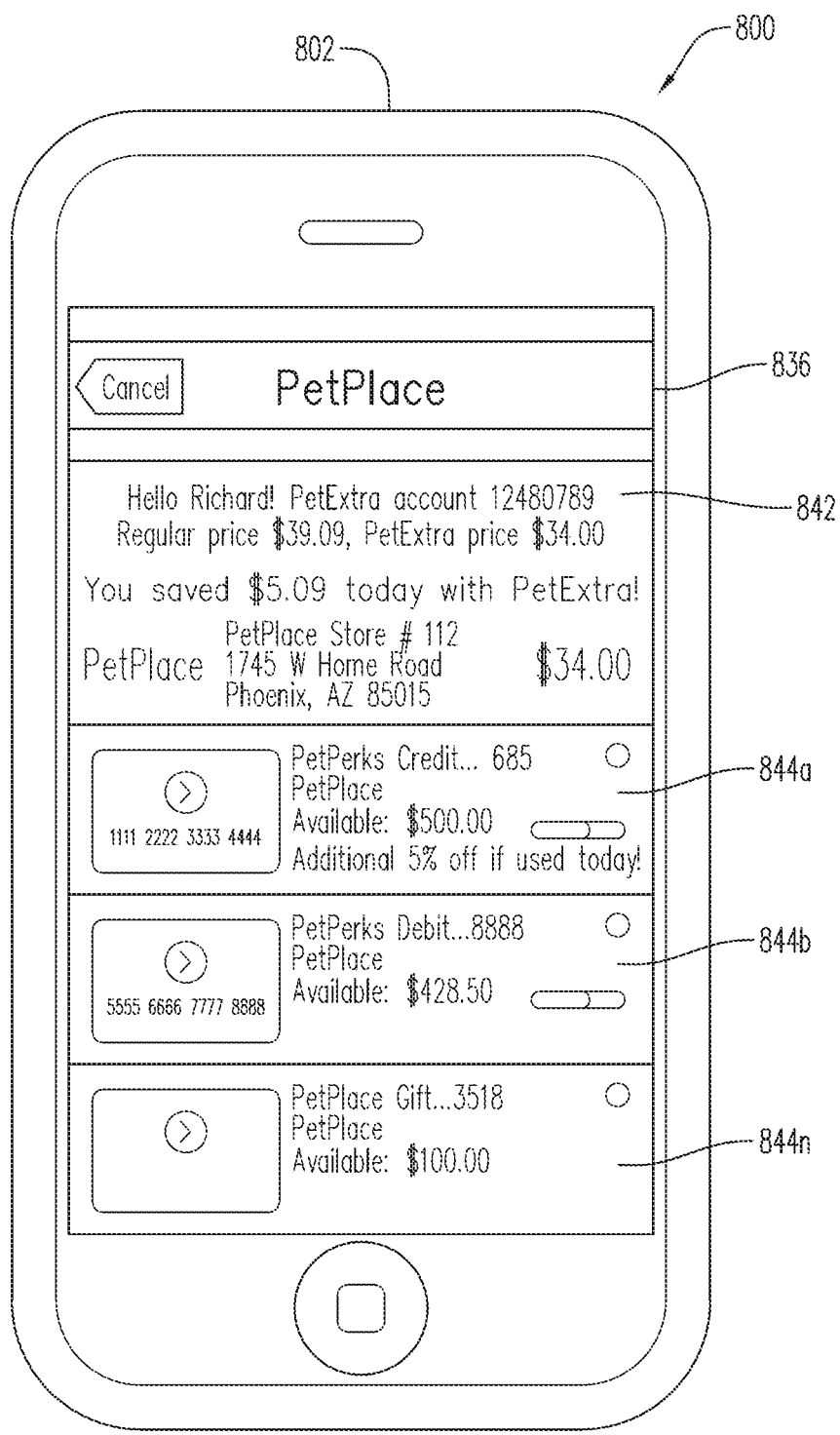
FIG. 8A-8D are illustrative user interfaces for use in the present invention.

Processing continues at 516 where the mobile device 202, under control of the mobile application, presents the transaction details and enhanced payment account choice(s) to the customer on a display screen of the mobile device 202. For example, if the customer (during the registration process 300) provided information about one or more payment accounts, the customer may be given the opportunity to select which one(s) of those accounts are to be used in the current transaction. For example, the customer may be presented with a display of options such as shown in FIG. 8A. In some embodiments, the display of options may include information about the status of each of the available accounts (e.g., such as the balance, the current interest rate, any current rewards, any card linked offers associated with an account, or loyalty points, etc.) so that the customer may select the most appropriate account or set of accounts for use in the current transaction. In some embodiments, the actual payment account information is not stored in the mobile device; instead, a non-confidential or non-sensitive identifier is used to identify the account (where the actual account number is stored at the remote transaction management system 230). In some embodiments, the customer may select to split the transaction among two or more payment accounts.

Pursuant to some embodiments, the payment accounts available for use in the payment transaction are displayed in a priority or preference order based on any combination of: (i) rules or preferences established by the customer (e.g., such as the rules or preferences defined by the customer at 308 of FIG. 3 during a registration process), (ii) rules or preferences established by the merchant, (iii) rules or preferences established by the issuer of a payment account, and (iv) rules or preferences established by the transaction management system operator. A hierarchy or ordering of rules or preferences and their priorities may be specified to ensure that there are no conflicts between rules or preferences.

In some embodiments, the payment accounts available for use in the transaction are displayed in order based on one or more rules established by the merchant or based on the identity of the merchant 208. For example, the transaction management system may determine the identity of the merchant based on information received from the merchant 208 and may then determine if any merchant-specific rules have been established. Examples of merchant specific rules may include rules regarding interchange (e.g., such as rules which allow the merchant to reduce interchange by requiring PIN entry for debit cards, etc), or presenting payment accounts in a top to bottom order where the top account is the one that when used by the customer results in the merchant paying the smallest interchange fee, and the bottom account is the one that when used by the customer results in the merchant paying the highest interchange fee. Merchant specific rules may also include rules specifying that merchant-controlled payment types (such as private label credit cards, gift cards, etc.) are to be displayed with a higher preference than other available payment types.

In some embodiments, the display of available payment accounts may also involve the application of one or more rules established by an operator of the transaction management system 230. For example, in some embodiments, the transaction management system operator may be compensated (e.g., by issuers or sponsors) to display certain payment account types with a higher priority. Those skilled in the art, upon reading this disclosure, will recognize that other types and combinations of rules and preferences may be applied to display a list of available payment accounts to a customer during transactions of the present invention.

Figure 8B:
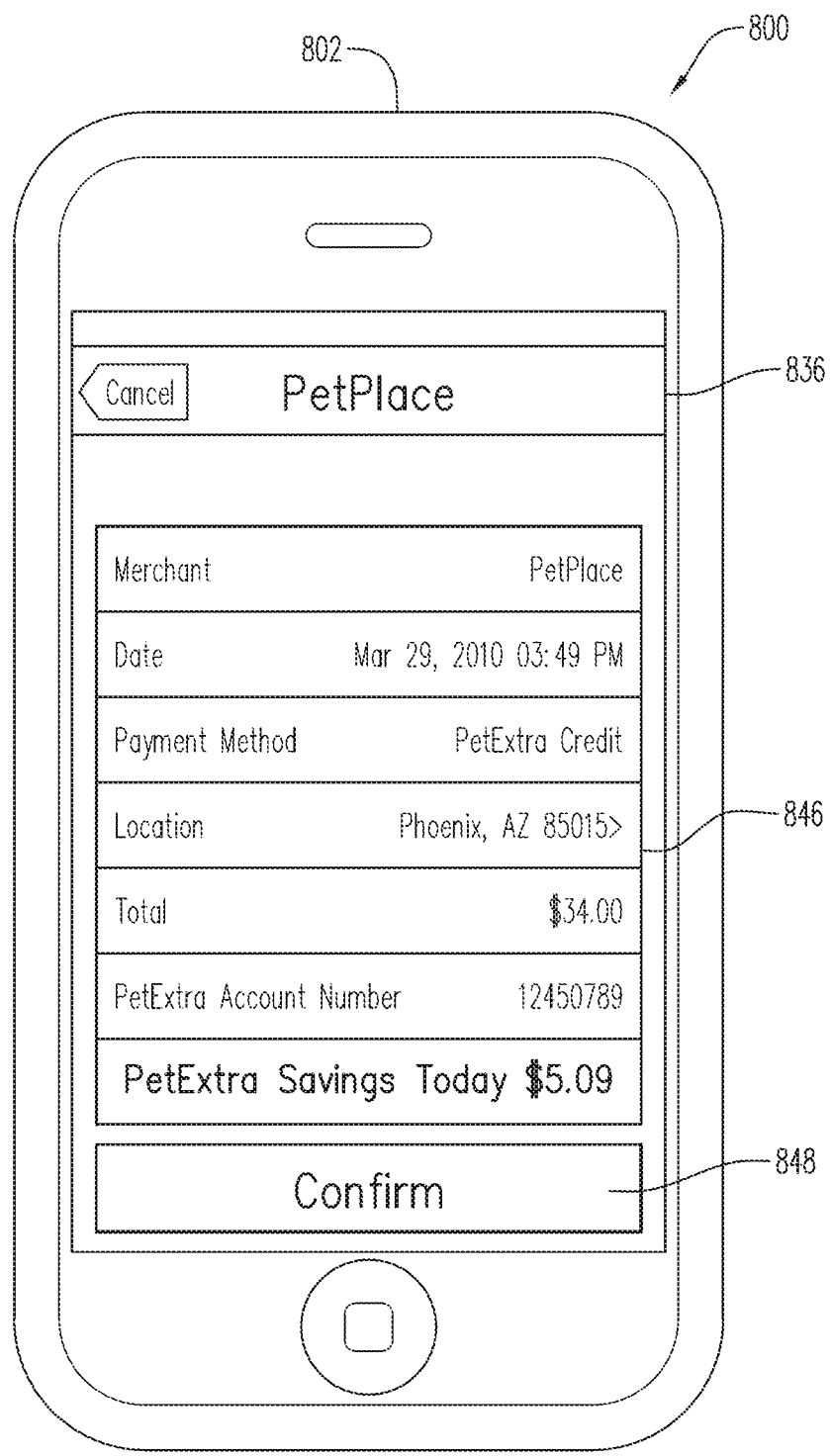

Processing continues at 518 where the customer interacts with the mobile device 202 (e.g., via a touch screen display or the like) to select a desired payment account (or payment accounts in the case of a split tender transaction) to use for the current transaction. In some embodiments, the customer may be presented with a confirmation screen at 518 where the customer is prompted to confirm the transaction details (including the merchant, the transaction amount and the selected payment account(s)). An example of such a confirmation screen and transaction details is shown at FIG. 8B. Once one or more payment accounts have been selected for use, processing continues at 520 where a customer payment authorization request message is transmitted to the transaction management system 230 for processing. In some embodiments, the message includes data such as information identifying the selected payment account(s) as well as the transaction amount. In cases such as fine dining (or transactions of the sort involving the addition of a tip or further amount after an initial transaction total has been generated), the present invention may allow the customer to change the transaction amount to include a tip amount for service, requiring that the transaction amount be updated by the customer. The transaction management system 230 receives the message and processes it as described below in conjunction with FIG. 6. If the transaction is successful (e.g., the transaction management system 230 is able to use the selected payment accounts to obtain a payment authorization from the institutions associated with the accounts), processing continues at 522 where the mobile device 202 receives a transaction complete message. Examples of such a message are shown below in FIG. 8D.

Reference is now made to FIG. 6, where a further transaction process 600 is shown. The process 600 generally shows steps from the perspective of the processing performed by the transaction management system (e.g., the transaction process 600 includes a number of steps that may be performed by a transaction management system, such as the system 230 of FIG. 2, or by systems or components related to a transaction management system to complete transactions pursuant to the present invention). As described above, the process 600 may be performed in conjunction with the process 400 performed by the merchant 208 and process 500 performed by a mobile device 202. Processing begins at 602 where the transaction management system 230 receives a customer authentication request from a customer operating a mobile device 202 pursuant to the present invention. As discussed in conjunction with items 502-506 of FIG. 5, the transaction management system 230 and the mobile device 202 interact to determine whether the customer can be authenticated. If so, processing continues at 608 where an authentication response is transmitted to the mobile device 202. Processing continues at 610 where the transaction management system 230 generates (or causes to be generated or assigned) a checkout token. The checkout token is associated with a pending transaction record in a transaction queue of the transaction management system 230 awaiting further information about the transaction (e.g., including information from the merchant and the mobile device as will be described further below). The checkout token is transmitted to the mobile device 202 for use by the mobile payment application. In some embodiments, one or more of steps 602, 608 and 610 may be combined. In some embodiments the delivery of one or more checkout token to the mobile device 202 could happen in advance of any payment transaction being conducted the customer, and the checkout tokens could be stored on the mobile device and one or more pending transaction records would be created in the transaction management system 230.

Processing continues at 612 where the transaction management system 230 receives a merchant payment request message from a merchant 208 involved in a transaction with the mobile device 202 (e.g., after the mobile device 202 was presented at an NFC reader associated with the merchant). The merchant payment request message 208 includes information associated with the transaction, including the checkout token and other transaction details. The pending transaction record associated with the transaction is updated in the transaction queue to include the information received in the merchant payment request message. In some embodiments, the merchant payment authorization request may include transaction data (such as merchant identifier, a time stamp, terminal identifier, purchase details, or the like) and an optional amount due (the "transaction amount"). The merchant payment authorization request is received from a merchant 208 based on a transaction conducted by a customer who has selected to use a mobile payment option pursuant to the present invention. In some embodiments, the information received is inserted into a merchant transaction queue. In some embodiments, the merchant transaction queue is a queue that contains a set of "pending" or unmatched transactions that have been initiated at merchant locations. In some embodiments, merchant payment authorization request data stays in the queue until matched with a customer payment authorization request received from a customer operating a mobile device. In some embodiments, a merchant payment authorization request may "time out" or expire if a matching customer payment authorization request is not received within a certain timeframe. In other embodiments, the merchant payment authorization requests in the merchant transaction queue may not be sent to the transaction management system; instead, they may reside on a server at the merchant location or some other location, and the transaction management system may have access to these merchant payment authorization requests so that it can match customer payment authorization requests received from mobile devices with the merchant payment authorization requests residing on the server at the merchant's location.

Processing continues at 614 where the transaction management system 230 determines payment account (and any loyalty or offer data) suitable or available for use by the customer in the transaction with the merchant and transmits the information to the mobile device 202. At 616, the transaction management system 230 receives a customer payment authorization request message from the mobile device 202. The message may include information identifying a selection of an available payment account from the customer (or, in some embodiments, may simply include a confirmation from the customer to proceed, e.g., with a default or other payment account).

In some embodiments, the transaction management system 230 receives the merchant payment authorization request message (at 612) first, and later receives a customer payment authorization request message (at 616). However, in some embodiments, a two-step process may be performed in which a merchant first transmits a merchant payment authorization request (even prior to totaling a transaction for a customer) and then doing an "update" to the merchant payment authorization request message when the total has been calculated. The customer may, in such embodiments, be presented with a message informing them that the system is "waiting for a total" on their mobile device along with the targeted offers. Once the total is calculated, the merchant systems send an update to the merchant payment authorization request to the transaction management system which includes the total transaction amount, and then the customers' mobile display would be updated to show the transaction details and the list of payment accounts with all rules applied.

The transaction information (including merchant name and location and the transaction amount, for example) and the available payment account information, are transmitted to the customer's mobile device 202 at 614. Processing continues at 616 where the system 230 receives a customer payment authorization request message which includes the customer's selected payment account(s) for use in completing the transaction. At 618, the system 230 uses the payment account information received at 616 to lookup the actual payment credentials associated with the account(s) identified by the customer. The actual payment credentials may be stored in a system accessible to the transaction management system 230 which is PCI compliant (e.g., which securely stores and protects the actual payment credentials). At 620, the actual payment credentials are used to obtain payment transaction authorization from the appropriate payment network and/or financial institution. The payment authorization response is then sent to the merchant as well as to the customer at 622 to complete the transaction.

In this manner, embodiments allow payment processing to occur where the customer does not need to reveal payment account information to a merchant. Further, the customer is able to use a mobile device to complete the transaction. No card need be presented, nor does any customer information need to be transmitted over unsecured networks. Further, the customer can select from a number of different payment account types and may even create split transactions (where different account types are used in the same transaction).

To illustrate some embodiments of the transaction flow described above, an illustrative example will be provided. In the illustrative example, a customer has installed a payment application pursuant to the present invention on her NFC enabled mobile device, and wishes to make a purchase at a merchant that has an NFC reader at the point of sale. The merchant rings up the goods on a point of sale device, and prompts the customer to select a payment option. One of the available payment options is to pay with an NFC enabled mobile device. The customer selects this option, and interacts with the mobile payment application on the mobile device to obtain a checkout token. Once the checkout token is obtained by the mobile device, the customer is prompted to "tap" or present the NFC enabled mobile device to the NFC reader. By tapping or presenting the NFC enabled mobile device to the NFC reader, the checkout token is passed to the merchant systems. The merchant then creates a payment authorization request (including the checkout token) and causes the request message to be routed to the transaction management system. The transaction management system uses the checkout token to identify a pending transaction record (which allows the transaction management system to identify the customer) and determines one or more available payment accounts (and, if appropriate, any offers or loyalty programs) available for the customer's use in the transaction. Transaction details (including information identifying the available payment accounts and offers) are transmitted to the mobile device and the customer selects to complete the transaction (which may include, if appropriate, a selection of one or more available payment accounts and offers). The transaction management system then retrieves the actual payment account credentials associated with the selected accounts and obtains a payment authorization using the actual credentials. Once a successful authorization has been obtained, a confirmation is sent to the merchant and to the customer.

Figure 7:
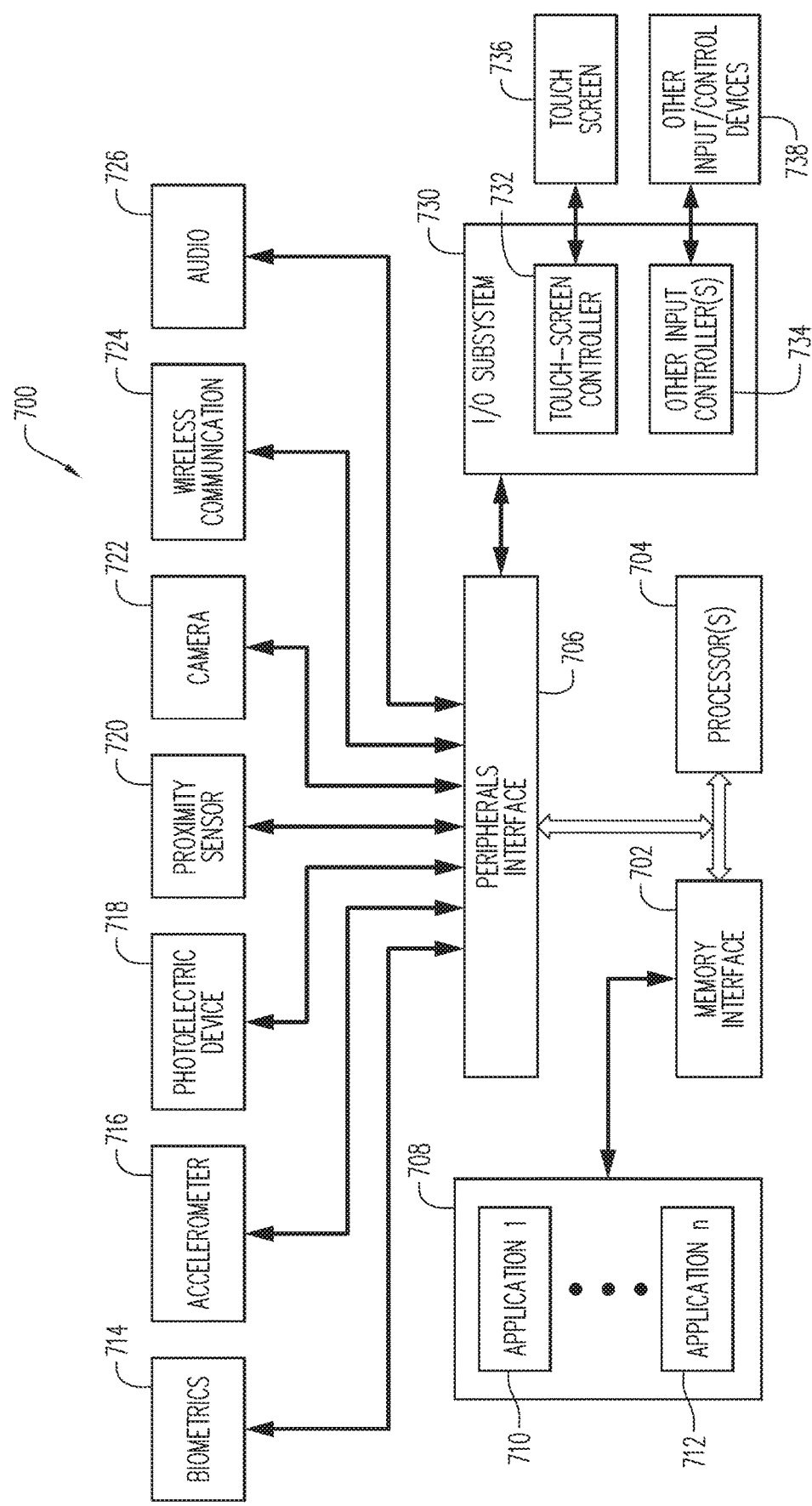
FIG. 7 is a block diagram depicting further details of a mobile device pursuant to some embodiments.

Reference is now made to FIG. 7, where a block diagram is shown depicting components of a mobile device 700 pursuant to some embodiments. As depicted, the mobile device 700 includes a number of components which may be controlled or perform functions in conjunction with one more application programs 710-712 to perform the features of some embodiments.

The mobile device 700 can include a memory interface 702 one or more data processors, image processors and/or central processing units 704, and a peripherals interface 706. The memory interface 702, the one or more processors 704 and/or the 15 peripherals interface 706 can be separate components or can be integrated in one or more integrated circuits. The various components in the mobile device 700 can be coupled by one or more communication buses or signal lines.

Sensors, devices and subsystems can be coupled to the peripherals interface 706 to facilitate multiple functionalities. For example, one or more sensors, including a biometrics sensor 714, an accelerometer 716, a photoelectric device 718, a proximity sensor 720, a camera 722, a wireless communication unit 724, an audio unit 726 and a magnetometer 728 may be provided to facilitate the collection, use and interaction with data and information and to achieve the functions of the payment applications described herein. For example, when provided, the magnetometer 728 may be used to calculate a position of the mobile device 700 in space, allowing improved capturing of checkout tokens.

The mobile device 700 may include one or more input/output (I/O) devices 730 and/or sensor devices. For example, input controllers 734 may be provided with a speaker and a microphone (not shown) to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

The I/O subsystem 730 can include a touch screen controller 732 and/or other input controller(s) 734. The touch-screen controller 732 can be coupled to a touch screen 736. The touch screen 736 and touch screen controller 732 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 736.

The other input controller(s) 734 can be coupled to other input/control devices 738, such as one or more buttons, rocker switches, thumb-wheel, infrared port, USB port, and/or a pointer device such as a stylus. The one or more buttons (not shown) can include an up/down button for volume control of the speaker and/or the microphone.

In some implementations, a proximity sensor 720 can be included to facilitate the detection of the customer positioning the mobile device 700 proximate to a point of sale terminal or display and, in response, to activate the camera or other reader to detect or capture an image of a checkout token.

Other sensors can also be used. For example, in some implementations, a photoelectric device 718 may be provided to facilitate adjusting the brightness of the touch-screen display 738. In some implementations, an accelerometer 716 can be utilized to detect movement of the mobile device 700, and a magnetometer can also be used to help detect the position of the mobile device. In some embodiments, the mobile device 700 may include circuitry and sensors for supporting a location determining capability, such as that provided by the global positioning system (GPS) or other positioning system (e.g., systems using Wi-Fi access points, television signals, cellular grids, cellular towers, or Uniform Resource Locators (URLs)). In some implementations, a positioning system (e.g., a GPS receiver) can be integrated into the mobile device 700 or provided as a separate device that can be coupled to the mobile device 700 through a peripherals interface 706 to provide access to location-based services. The positioning and location-based services may be used, for example, to tag data transmitted from the mobile device 700 to transaction management systems. For example, such location data may be used to further identify the identity of a merchant which the customer is interacting with during a payment transaction, and may also be used to assist in fraud detection by insuring that the mobile device is in close proximity to the point of sale location specified in the information received in or derived from a merchant payment authorization request.

The mobile device 700 can also include a camera lens and sensor 722. In some implementations, the camera lens and sensor 722 can be located on the back surface of the mobile device 700, or on the front surface. The camera can capture still images and/or video, and could be used as a scanner and to enable biometric access to a payment application on the phone, by verifying eye iris or retinal patterns or fingerprints. In some embodiments, separate subsystems such as a fingerprint scanner or eye scanner may be provided. The camera may be used, for example, to capture or capture images of a checkout token associated with a merchant point of sale location. In some embodiments, the operation of the camera 722 may be controlled by a payment application installed on the mobile device 700. As a specific example, when the payment application is activated to make a purchase transaction, the camera 722 may be placed in a ready mode of operation so that as soon as the camera lens and sensor 722 are placed proximate to a checkout token, the camera lens and sensor 722 may be operated to capture an image of the checkout token for use in the payment application.

The mobile device 700 can also include one or more wireless communication subsystems 724, such as an 802.11b/g communication device, RFID, NFC, and/or a Bluetooth® or Bluetooth Low Energy (BLE) communication device. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA,), 4G, LTE, etc.

In some implementations, additional sensors or subsystems may be coupled to the peripherals interface 706 via connectors such as, for example a Universal Serial Bus (USB) port, or a docking port, or some other wired port connection.

The memory interface 702 can be coupled to memory 708. The memory 708 can include high-speed random access memory and/or non-volatile memory, such as one or more magnetic disk storage devices, one or more optical storage devices, and/or flash memory (e.g., NAND, NOR). The memory 708 can store an operating system, such as Android, IOS from Apple, Darwin, RTXC, LINUX, UNIX, OS X, WINDOWS, or an embedded operating system such as VxWorks. The operating system may include instructions for handling basic system services and for performing hardware dependent tasks. In some implementations, the operating system can be a kernel (e.g., UNIX kernel).

The memory 708 may also store application programs 710-712 which act, in conjunction with the processors 704, to cause the mobile device to operate to perform certain functions, including the payment application related functions described herein.

The memory 708 can also store data, including but not limited to documents, images (including payment account card images and images containing advertisements and offers), video files, audio files, and other data. The mobile device 700 may be configured to operate using a number of different operating systems and to communicate using a number of different communications networks. Those skilled in the art will appreciate that the mobile device 700 may be sized as a handheld mobile phone, or other portable device such as a tablet computer or the like.

Reference is now made to FIGS. 8A-8D which depict a number of illustrative user interfaces that may be presented to a user operating a mobile device (such as the mobile device 202 of FIG. 2) on a display screen of the device (such as the display 236 of FIG. 2) so that the customer can conduct payment transactions using features of embodiments of the present invention. Each of the customer interfaces are shown as being displayed on an NFC enabled mobile device—those skilled in the art will appreciate that similar user interfaces may be displayed on other mobile devices.

Referring now to FIG. 8A, a user interface is shown on a display device 836 of a mobile device 802. In the user interface of FIG. 8A, the customer has obtained a checkout token and authenticated to the transaction management system (and has provided the checkout token to an NFC reader of a merchant), and has received a response message from a transaction management system (such as the system 230 of FIG. 2) with details of the payment transaction that the customer is about to complete. In particular, the transaction management system has returned detailed transaction information about the purchase transaction, including merchant information and the purchase amount (shown as item 842). The user interface also shows the customer a number of available payment options 844a-n. The available payment options 844a-n may be shown in the order of preference or desirability based on, for example, customer preferences or rules established by the customer (e.g., pursuant to the process described above in conjunction with FIG. 3 or the like), by the merchant, or by the payment system operator. For example, as shown, a private label credit card is displayed as the first (or top-most) payment account 844a. Information about each of the payment accounts 844 may be displayed, including the current available balance as well as any reward, loyalty or other benefits associated with using that particular payment account in the current transaction.

In the user interface of FIG. 8A, the customer may select which of the available payment accounts 844a-n to use by simply clicking on the portion of the screen associated with the available payment account 844a-n desired. In some embodiments, further information about each available payment account may be viewed by clicking on a portion of the display screen. For example, details of each accounts balance, terms and conditions and other information may be viewed. The user interface of FIG. 8A may be presented to the customer in conjunction with transaction processing such as at step 514, 516 of FIG. 5.

Referring now to FIG. 8B, an (optional) further user interface is shown again on a display device 836 of a mobile device 802. The user interface of FIG. 8B is an optional interface (in some embodiments, a user may go directly from the interface of FIG. 8A or FIG. 8B to obtaining an authorization, such as in the case where the user has specified a single "default" payment account to use for all transactions. In this case the user may choose to not be presented with the interface of FIG. 8A, and would instead go directly to obtaining an authorization.). In the user interface of FIG. 8B, the customer has selected which payment account to use and has been presented with a screen to confirm the payment details using the selected payment account. The user interface may display, for example, transaction details 846 and a confirmation button 848. The transaction details show the detailed transaction information received by the mobile device 802 from the transaction management system. For example, the user interface of FIG. 8B may be displayed after the customer has selected a desired payment account, and immediately prior to the transmission of a message to the transaction management system (e.g., such as at step 520 of FIG. 5).

Figure 8C:
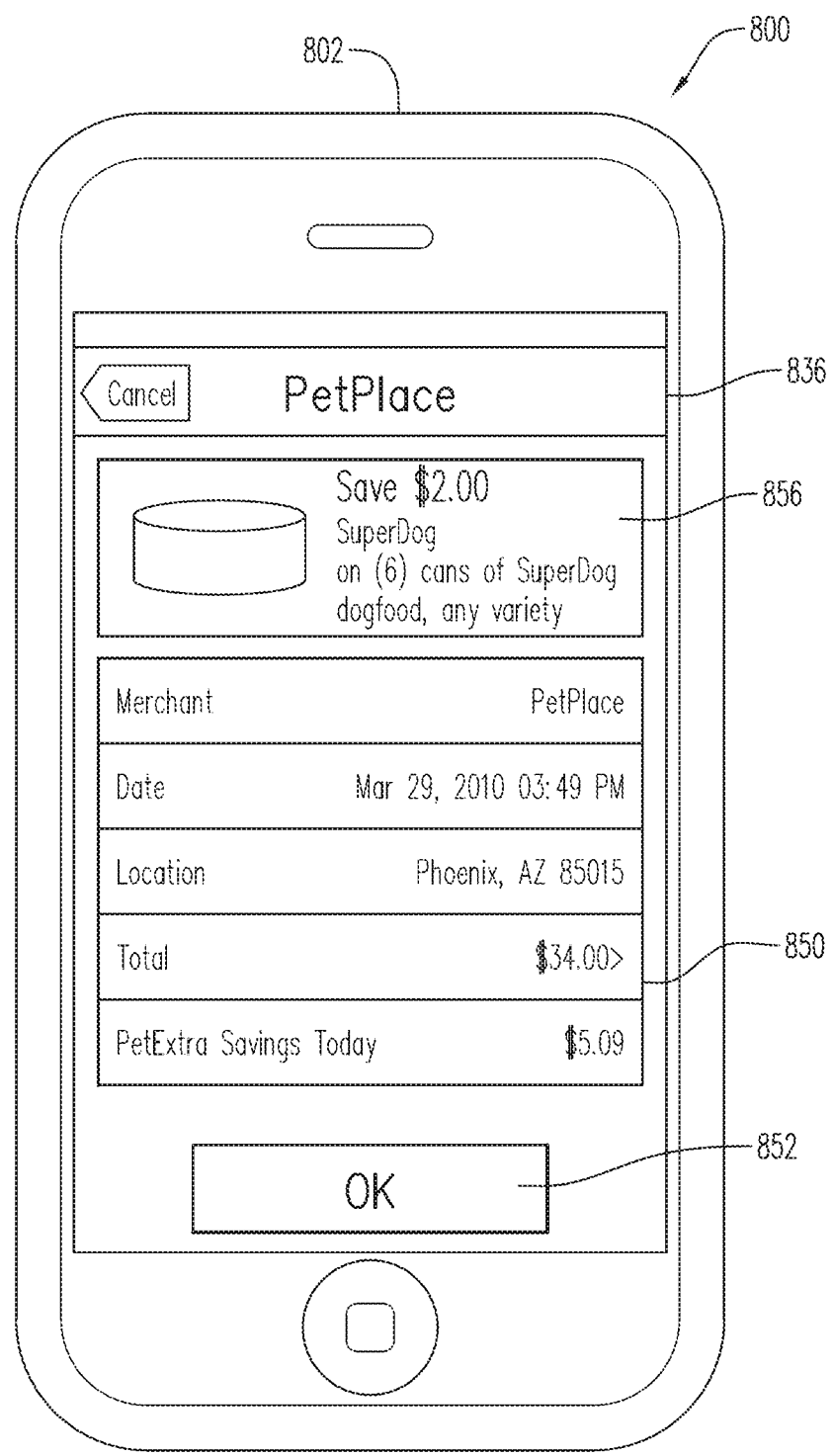
Figure 8D:
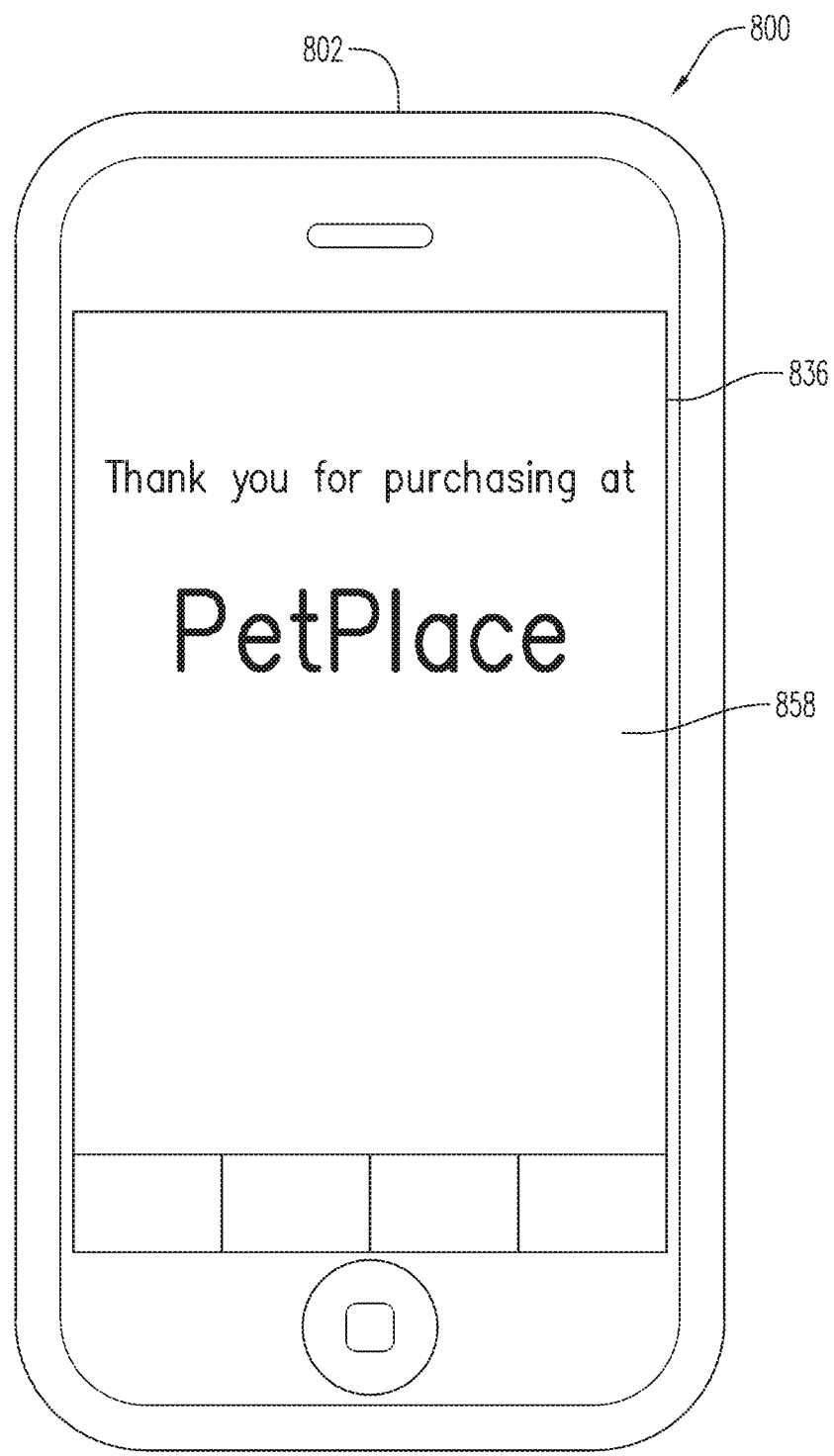

Referring now to FIG. 8C, a further user interface is shown, again on a display device 836 of a mobile device 802. In the user interface of FIG. 8C the customer has confirmed the purchase (e.g., by selecting "Confirm" 848 on FIG. 8B or by tapping on one of the payment accounts 844a-n in FIG. 8A, or by having specified a default payment instrument to use for all transactions), and the payment message has been transmitted to the transaction management system. The user interface of FIG. 8C shows the customer the details 850 of the just-completed transaction including any loyalty rewards, rebate amount or the like earned from the transaction (shown at 854 as a savings amount). The user interface also shows a region 856 where coupons, advertisements, or other offers sourced from advertising and offer management networks may be presented to the customer. Once the customer is done viewing the transaction details, the customer may click on a button 852 to navigate away from the screen and to return to the home page of the payment application or to a thank you page such as the page 858 shown in the user interface of FIG. 8D.

Those skilled in the art will appreciate that other user interfaces, messages and screens may be used to present payment options, transaction information and other details to a user of a mobile payment application pursuant to the present invention.

The above descriptions of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for performing a transaction, comprising:
   receiving, by a transaction management system from a merchant Point Of Sale (POS) device, a first merchant transaction authorization request that does not include a transaction amount and that identifies a merchant and a first checkout token that was previously issued to a customer account;
   creating, by the transaction management system, a pending transaction in association with at least one customer payment account associated with the customer account;
   providing, by the transaction management system for display on a customer mobile device that is linked with the customer account, a first pending transaction screen that identifies the merchant, at least one offer that is based on information in the customer account, and the at least one customer payment account;
   receiving, by the transaction management system from the merchant POS device and subsequent to providing the first pending transaction screen for display on the customer mobile device, a second merchant transaction authorization request that includes a transaction amount due;
   providing, by the transaction management system for display on the customer mobile device subsequent to providing the first pending transaction screen for display on the customer mobile device, a second pending transaction screen that identifies the merchant, the at least one customer payment account, and the transaction amount due; and
   causing, by the transaction management system subsequent to providing the second pending transaction screen for display on the customer mobile device, funds to be transferred from the at least one customer payment account to the merchant.

2. The method of claim 1, wherein the at least one customer payment account includes a plurality of customer payment accounts, and the method further comprises:
   receiving, by the transaction management system, a selection of a first customer payment account from the plurality of customer payment accounts, wherein the transaction management system causes the funds to be transferred from the first customer payment account to the merchant.

3. The method of claim 2, wherein the transaction management system identifies the plurality of customer payment accounts using a plurality of customer provided rules that are associated with the customer account.

4. The method of claim 1, wherein the
   at least one offer that is based on information in the customer account includes at least one of a coupon, a loyalty incentive, or an advertisement.

5. The method of claim 1, wherein the first pending transaction screen includes:
   an indication that the transaction management system is waiting on the transaction amount due from the merchant.

6. The method of claim 1, further comprising:
   issuing, by the transaction management system prior to receiving the first merchant transaction authorization request, a plurality of checkout tokens that include the first checkout token.

7. The method of claim 1, wherein the at least one customer payment account includes a merchant loyalty account, and wherein the second pending transaction screen includes:
   a calculated loyalty savings resulting from the use of the merchant loyalty account.

8. The method of claim 1, wherein the creating the pending transaction in association with the at least one customer payment account includes:
   selecting the at least one customer payment account based on the transaction amount due.

9. The method of claim 8, wherein the at least one customer payment account is designated as a default account for the transaction amount due.

10. The method of claim 1, wherein the creating the pending transaction in association with the at least one customer payment account includes:
    selecting the at least one customer payment account based on an identity of the merchant.

11. A transaction management system, comprising:
    a non-transitory memory; and
    at least one hardware processor coupled to the non-transitory memory and configured to read instructions from the non-transitory memory to cause the system to perform operations comprising:
       receiving, from a merchant Point Of Sale (POS) device, a pending merchant transaction authorization request that does not include a transaction amount and that identifies a merchant and a checkout token that was previously issued to a customer account;
       creating a pending transaction in association with at least one customer payment account associated with the customer account;
       providing, for display on a computing device that is linked with the customer account, a pending transaction screen that identifies the merchant, at least one offer that is based on information in the customer account, and the at least one customer payment account;
       receiving, from the merchant POS device and subsequent to providing the pending transaction screen for display on the computing device, an updated merchant transaction authorization request that includes a transaction amount due;
       providing, for display on the computing device subsequent to providing the pending transaction screen for display on the computing device, an updated transaction screen that identifies the merchant, the at least one customer payment account, and the transaction amount due; and causing, subsequent to providing the updated transaction screen for display on the computing device, funds to be transferred from the at least one customer payment account to the merchant.

12. The transaction management system of claim 11, wherein the at least one customer payment account includes a plurality of customer payment accounts, and the operations further comprise:

receiving a selection of a first customer payment account from the plurality of customer payment accounts and, in response, causing the funds to be transferred from the first customer payment account to the merchant.

13. The transaction management system of claim 12, wherein the plurality of customer payment accounts are identified using a plurality of customer provided rules that are associated with the customer account.

14. The transaction management system of claim 11, wherein the at least one offer that is based on information in the customer account includes at least one of a coupon, a loyalty incentive, or an advertisement.

15. The transaction management system of claim 11, wherein the operations further comprise:

issuing, prior to receiving the pending merchant transaction authorization request, a plurality of checkout tokens that include the checkout token that was previously issued to the customer account.

16. The transaction management system of claim 11, wherein the at least one customer payment account includes a merchant loyalty account, and wherein the updated transaction screen includes:

a calculated loyalty savings resulting from a use of the merchant loyalty account.

17. A non-transitory, machine-readable medium having stored thereon machine-readable instructions executable to cause a machine to perform operations comprising:

receiving, from a merchant Point Of Sale (POS) device, a pending transaction authorization request that does not include a transaction amount;

creating a pending transaction in association with at least one customer payment account that is associated with a customer identified in the pending transaction authorization request;

providing, for display on a device that is linked with the customer, a pending transaction screen that identifies a merchant identified in the pending transaction authorization request, at least one offer that is based on information in a customer account, and the at least one customer payment account;

receiving, from the merchant POS device and subsequent to providing the pending transaction screen for display on the device, an updated transaction authorization request that includes a transaction amount due;

providing, for display on the device subsequent to providing the pending transaction screen for display on the device, an updated transaction screen that identifies the transaction amount due; and causing, subsequent to providing the updated transaction screen for display on the device and in order to complete the pending transaction, funds to be transferred from the at least one customer payment account to the merchant; and completing the pending transaction after the funds have been transferred from the at least one customer payment account to the merchant.

18. The non-transitory, machine-readable medium of claim 17, wherein the creating the pending transaction in association with at least one customer payment account includes:

selecting the at least one customer payment account based on the transaction amount due.

19. The non-transitory, machine-readable medium of claim 18, wherein the at least one customer payment account is designated as a default account for the transaction amount due.

20. The non-transitory, machine-readable medium of claim 17, wherein the creating the pending transaction in association with at least one customer payment account includes:

selecting the at least one customer payment account based on an identity of the merchant.

* * * * *